(12) United States Patent
Rowles

(10) Patent No.: US 11,681,422 B2
(45) Date of Patent: Jun. 20, 2023

(54) METHODS FOR A USER SELECTABLE DIGITAL MIRROR

(71) Applicant: John W. Rowles, Cupertino, CA (US)

(72) Inventor: John W. Rowles, Cupertino, CA (US)

( * ) Notice: Subject to any disclaimer, the term of this patent is extended or adjusted under 35 U.S.C. 154(b) by 58 days.

(21) Appl. No.: 17/327,760

(22) Filed: May 23, 2021

(65) Prior Publication Data

US 2022/0011928 A1 Jan. 13, 2022

Related U.S. Application Data

(63) Continuation-in-part of application No. 15/497,190, filed on Apr. 25, 2017, now abandoned, which is a continuation-in-part of application No. 14/841,688, filed on Aug. 31, 2015, now Pat. No. 9,961,245, and a continuation-in-part of application No. 13/029,094, filed on Feb. 16, 2011, now Pat. No. 9,122,320.

(60) Provisional application No. 61/399,300, filed on Jul. 10, 2010, provisional application No. 61/338,106, filed on Feb. 16, 2010, provisional application No. 61/338,105, filed on Feb. 16, 2010.

(51) Int. Cl.
*G06F 3/04845* (2022.01)
*G06F 3/04842* (2022.01)
*H04N 23/56* (2023.01)
*H04N 23/57* (2023.01)

(52) U.S. Cl.
CPC ...... *G06F 3/04845* (2013.01); *G06F 3/04842* (2013.01); *H04N 23/56* (2023.01); *H04N 23/57* (2023.01); *G06F 2203/04806* (2013.01)

(58) Field of Classification Search
CPC ............ H04N 5/2256; H04N 5/23241; H04N 5/2354; H04N 5/23219; H04N 5/2257; H04N 5/23293; H04N 7/183; G06F 3/04845; G06F 3/04842; G06F 2203/04806
See application file for complete search history.

(56) References Cited

U.S. PATENT DOCUMENTS

| | | | | |
|---|---|---|---|---|
| 8,749,633 | B2 * | 6/2014 | Schofield | H04N 25/76 348/148 |
| 9,122,320 | B1 * | 9/2015 | Rowles | G06F 3/0317 |
| 9,961,245 | B1 * | 5/2018 | Rowles | H05B 39/042 |

(Continued)

FOREIGN PATENT DOCUMENTS

| | | | | |
|---|---|---|---|---|
| AU | 2014304760 A1 * | 2/2016 | | G06F 3/011 |
| CN | 111399734 A * | 7/2020 | | G06F 3/04847 |

*Primary Examiner* — Vinh T Lam

(57) ABSTRACT

In one aspect, a method provides a display device. The method senses the presence of the user or scene change within the field of view of the system's image sensor with a built-in image signal processor. The method automatically and concurrently powers on the image sensor. The method lights one or more lights around the display device in response to sense the presence of the user or scene change. The method captures one or more frames of images of a user or scene change with the image sensor. Each frame includes an M by N array of pixel data. The M by N array of pixel data comprises a data structure consisting of a collection of pixel elements enumerated as pixel $P_{11}$ to pixel $P_{m1}$. The method stores the M by N array of pixel data as a frame of data written into a frame buffer memory of the display device.

19 Claims, 16 Drawing Sheets

(56) References Cited

U.S. PATENT DOCUMENTS

| | | | |
|---|---|---|---|
| 10,277,544 B2* | 4/2019 | Nakamura | H04L 51/10 |
| 10,277,853 B2* | 4/2019 | Furumochi | H04N 25/76 |
| 10,313,594 B2* | 6/2019 | Gera | H04N 23/632 |
| 10,462,412 B2* | 10/2019 | Ingle | H04N 5/77 |
| 10,489,607 B2* | 11/2019 | Maisonneuve | G06F 21/6209 |
| 10,543,786 B2* | 1/2020 | Schofield | B60R 11/04 |
| 10,742,863 B2* | 8/2020 | Kumamoto | G06V 40/103 |
| 11,068,682 B2* | 7/2021 | Chen | G06T 5/002 |
| 11,069,143 B2* | 7/2021 | Kim | G06F 3/04815 |
| 11,194,445 B2* | 12/2021 | Lee | G06T 19/00 |
| 11,222,472 B2* | 1/2022 | Woo | B25J 9/1697 |
| 11,307,746 B2* | 4/2022 | Chesnokov | G06F 3/04883 |
| 11,314,401 B2* | 4/2022 | Lee | G06F 3/011 |
| 11,336,600 B2* | 5/2022 | Garrido | G06F 3/04845 |
| 11,372,659 B2* | 6/2022 | Guzman | G06F 9/452 |
| 11,438,523 B2* | 9/2022 | Nashizawa | H04N 23/76 |
| 2016/0044227 A1* | 2/2016 | Johnson | G03B 17/563 |
| | | | 348/211.2 |
| 2017/0257543 A1* | 9/2017 | Rowles | B60R 11/02 |
| 2018/0228430 A1* | 8/2018 | Perez Marcos | G16H 40/63 |
| 2019/0199937 A1* | 6/2019 | Fluegel | H04N 23/90 |
| 2019/0342240 A1* | 11/2019 | Garrido | H04M 1/72439 |
| 2019/0384414 A1* | 12/2019 | Woo | G06V 40/174 |
| 2019/0384484 A1* | 12/2019 | Lee | G06F 3/04815 |
| 2020/0099858 A1* | 3/2020 | Lee | G06F 40/58 |
| 2021/0055801 A1* | 2/2021 | Lee | G06F 3/005 |
| 2021/0235943 A1* | 8/2021 | Ophardt | G06F 3/04842 |
| 2022/0011928 A1* | 1/2022 | Rowles | G06F 3/04845 |

* cited by examiner

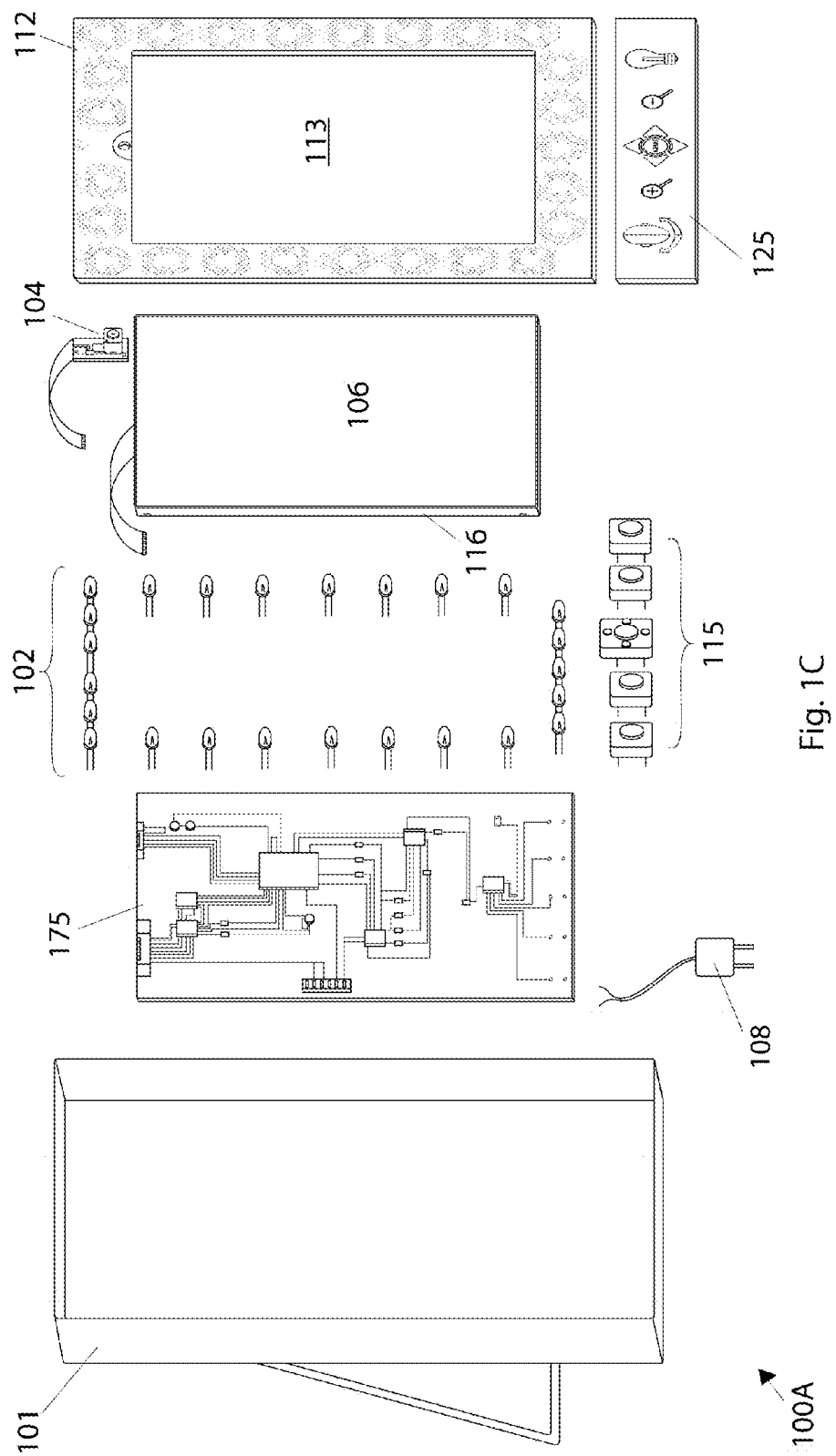

US 11,681,422 B2

METHODS FOR A USER SELECTABLE DIGITAL MIRROR

CLAIM OF PRIORITY

This non-provisional U.S. patent application claims the benefit of U.S. patent application Ser. No. 15/497,190 filed on Apr. 25, 2017 by John W. Rowles, et al., entitled METHODS FOR USER SELECTABLE DIGITAL MIRROR, which is incorporated herein by reference.

Non-provisional U.S. patent application Ser. No. 15/497,190 claim priority to non-provisional U.S. patent application Ser. No. 14/841,688 filed on Aug. 31, 2015 and U.S. Pat. No. 9,961,245. Non-provisional U.S. patent application Ser. No. 14/841,688 claim priority to non-provisional U.S. patent application Ser. No. 13/029,094 filed on Feb. 16, 2011 and U.S. Pat. No. 9,122,320. Non-provisional U.S. patent application Ser. No. 13/029,094 claims the benefit of U.S. Provisional Patent Application No. 61/338,105 filed on Feb. 16, 2010 by John W. Rowles, et al., entitled DIGITAL MIRROR, which is incorporated herein by reference. This non-provisional U.S. patent application also claims the benefit of U.S. Provisional Patent Application No. 61/338,106 filed on Feb. 16, 2010 by John W. Rowles, et al., entitled TECHNIQUES FOR IMAGE CAPTURE THROUGH LIQUID CRYSTAL DISPLAYS; and U.S. Provisional Patent Application No. 61/399,300 filed on Jul. 10, 2010 by John Rowles, et al., entitled DIGITAL MIRROR SMARTPHONE APPLICATION, which are both incorporated herein by reference. These applications are incorporated by reference in their entirety.

FIELD OF INVENTION

The embodiments of the invention generally relate to digital cameras, digital picture frames, and mirrors.

BACKGROUND

Optical mirrors are common household items that are used to adjust or verify the user's appearance and features. With optical mirrors, a reflective material is typically encapsulated with glass that provides a reflection or a reverse image of the actual user. While optical mirrors are extremely useful in providing information that cannot be viewed directly, aberrations may occur in the medium used to reflect the information. Moreover, optical mirrors provide a transposed image to the user. Objects shown in an optical mirror are horizontally flipped (e.g., from left to right and vice versa).

Users may also be hampered with the fixed state of the optical mirror and unable to easily view objects at different angles. For example, several mirrors may be required to view the back of ones' head. Other examples of difficulty with an optical mirror are more attributed to the three-dimensional aspect of an object being viewed on a two-dimensional surface of the mirror. In many cases, multiple mirrors are used to view the topology of the object.

Proper lighting of an object that is to be viewed in an optical mirror may be challenging. The ability to light an object such that its mirrored image provides a view of a desired feature may be hampered by shadows or require multiple light sources in order to provide a clear view of the object feature.

Optical mirrors are used for many purposes such as medical devices, personal/vanity use, and automotive applications. While optical mirrors are simple to construct, if improperly constructed, the image they reflect may be misleading. Some optical properties of an optical mirror can be manipulated for additional useful effects. However, the optical properties are typically fixed in an optical mirror in the sense that they cannot be modified or changed once created. Any defect, whether intentional or not, once cast in glass cannot be easily changed.

Other optical aberrations may include distortions from the quality of the glass and the reflective material deployed. The material properties of these components become critical for determining depth of focus and minimizing distortion from elements such as elongation. An example of these can be seen at a carnival show where mirrors are deployed to distort the user's appearance in an effort to provoke laughter in the unusual shapes reflected or mirrored back to the user.

Optical aberrations can be found in optical side view mirrors utilized on automobiles to provide additional views of surrounding traffic. Typically, the automobile manufacturers provide a warning label such as "Objects in the mirror are closer than they appear" in order to educate the user on the hazards of convex properties that have been intentionally instilled into a side view mirror to provide a wide-angle view. Convex and concave properties are perspective distortions in optical mirrors.

SUMMARY OF THE INVENTION

In one aspect, a method provides a display device. The method senses the presence of the user or scene change within the field of view of the system's image sensor with a built-in image signal processor. The method automatically and concurrently powers on the image sensor. The method lights one or more lights around the display device in response to sense the presence of the user or scene change.

The method captures one or more frames of images of a user or scene change with the image sensor. Each frame includes an M by N array of pixel data. The M by N array of pixel data comprises a data structure consisting of a collection of pixel elements enumerated as pixel $P_{11}$ to pixel $P_{m1}$. The method stores the M by N array of pixel data as a frame of data written into a frame buffer memory of the display device.

The method organizes the M by N array of pixel data in the frame buffer by writing pixel $P_{11}$ to pixel $P_{m1}$ from left to right. The method provides an image signal processor that displays the M by N array of pixel data in a true view mode and a mirror view mode.

The method receives a freeze image command input from a user. The method freezes the displayed the M by N array of pixel data by continuous reloading the M by N array of pixel data that was displayed at the time the freeze image command input was received.

In the true view mode, the image processor reads out the frame of data from left to right, from a pixel $P_{11}$ to a pixel $P_{m1}$ and instructs the frame of data to be displayed on the display device with pixel $P_{11}$ displayed in the upper left corner, with pixel $P_{m1}$ displayed in the upper right corner, with pixel $P_{1n}$ displayed in the lower left corner, and pixel $P_{mn}$ displayed in the lower right corner.

In the mirror view mode, the image processor reads out the frame of data by reversing an addressing of memory locations into the frame buffer memory such that the arrangement of the pixel data in the rows and columns is read out of the memory locations in a reverse order of the true view mode. The method displays one or more captured frames of images in a true view mode or a mirror view mode on the display device.

BRIEF DESCRIPTION OF THE DRAWINGS

FIG. 1C illustrates an exploded view of a digital mirror.

Figure 1A:
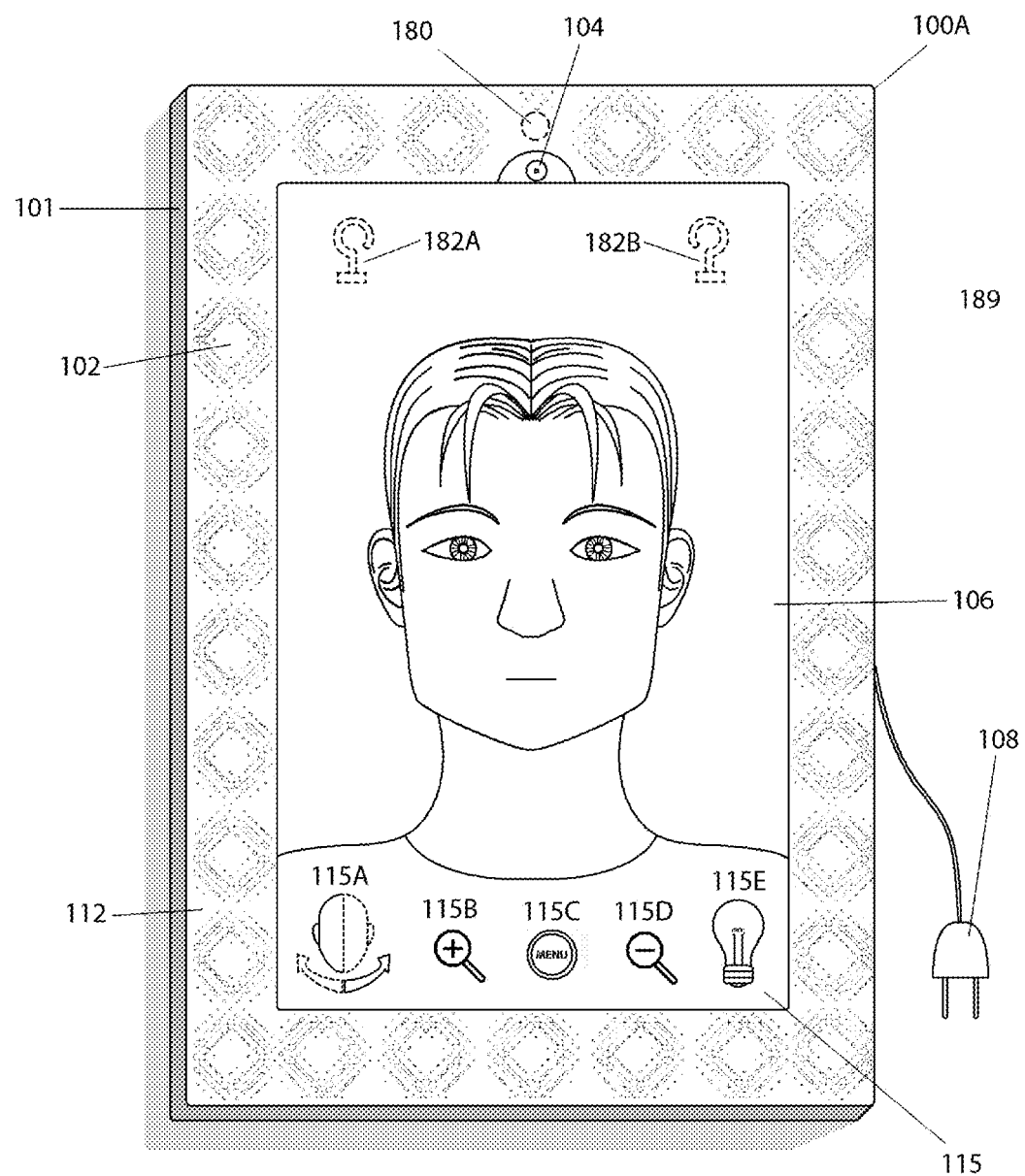
FIG. 1A illustrates a perspective view of a wall mountable digital mirror in accordance with one embodiment of the invention.

The Figures described above are a representative set and are not exhaustive with respect to embodying the invention.

DESCRIPTION

Disclosed are a system, method, and article for implementing a user selectable digital mirror. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Volatile memory, in contrast to non-volatile memory, is computer memory that requires power to maintain the stored information; it retains its contents while powered on but when the power is interrupted, the stored data can be lost.

Example Systems and Methods

Typical optical mirrors composed of a reflective material and potentially, encapsulated in glass, have characteristics that may not satisfy a user's requirements. A digital mirror has the ability to improve the user's experience in providing extended views of the user's features. The digital mirror also has the ability to enhance displayed images through the using imaging electronic components and software. Additionally, the combination of a plurality of lighting sources with selectable intensity, a plurality of camera choices and mounting applications may also enhance the user's experience.

There are a number of different applications for a digital mirror. For example, a wall mount digital mirror may be formed of different sizes depending on the user's discretion and interior design preferences. A large digital mirror may be desired for a user to view multiple views. A smaller digital mirror may be desired for smaller spaces and may offer a single view at a time for a quick view or reassurance.

The enclosure may also be integral in how the digital mirror may be configured to be compatible with the user's environment. The ability for a digital mirror to either be a focal point for the user's environment or an accessory to the user's environment may determine the style of the enclosure and thus the display size, lighting, number, and size of camera as well as the resolution and focus of the camera sensor.

A self-supported digital mirror (DM) may be used as a vanity mirror. It may include means for capturing side views for left, right and center viewing. The angle of the display of the digital mirror may be adjusted by a stand. A user interface further enables the user to select lighting, images to be viewed, and mirrored images (transposed from left to right) or true view images (e.g. non transposed).

In other embodiments of the invention, multiple cameras may extend to the left and right of the user to capture left, right, and side images for displaying on a single center display. The additional cameras can be moved to capture or whatever angles the user desires to view. The user simply may select the desired view through a menu of a graphics user interface or buttons of an electromechanical user interface. Multiple images of different views may be concurrently displayed in a mosaic arrangement on a display. This is different with an optical mirror. The enclosure houses together one or more of the lighting capabilities and arrangements, the camera views, and the display device software executed by a process may further enhance the display of images on a digital mirror.

The ability to alter digital images is a common technique used in digital photography. Software may be interactive with the elemental components such that lighting can be automatically dimmed or made brighter depending on the user's preference settings, such as an auto brightness feature. The enclosure may house one or more lighting sources such as incandescent lights, florescent lights, compact florescent lights, or LED (light emitting diode) devices, may be used singularly or in any combination in order to facilitate the user's desired lighting. Light sources have well defined characteristics such as incandescent lights sources may be seen as having a yellow tint whereas florescent lights may be seen to have a bluish tint. Lighting to display appropriate shades of images provided by the digital mirror may also be responsive to the user's movement and ambient lighting conditions given the time of day.

In another embodiment of the invention a portable, battery powered compact digital mirror would be beneficial for travel or where AC powered accessories are not easily supported. In this case the camera, the lighting sources, and display device technology are selected to support battery-powered operation.

Sensors may be used to prevent excessive battery-power drain and increase viewing time by adjusting the lighting intensity in response to the reflective light and ambient light. The cameras of each digital mirror may act as the light sensor for each. Sensors may adjust lighting intensity and color depending on the users preferred settings for a particular ambient environment. For example, a compact version of the digital mirror may be used in a dark setting. In this case a sensor setting may be used to prevent a bright display that may be distracting.

The digital mirror also provides the ability to view a true non-transposed image of a user. Typical optical mirrors provide a transposed or mirrored image to the viewer such that the left side of an object/user is transposed to the right side of the image and the right side of an object/user is transposed to the left side of the image. A digital mirror can display either view depending on the user's selection through a GUI or an electromechanical user interface. Digital images can also be enhanced through software to change the user's appearance, such as remove wrinkles or age spots or any other variety of commonly undesired user appearance features. Digital imaging software may also manipulate the user's image to add features to the user's image.

In another embodiment of the invention, the camera may be detachable or separate from the display. The camera may communicate wirelessly through a common wireless protocol, such as IEEE 802.11. The ability to eliminate wires between the camera and display provides additional flexibility in locating the camera. For example, a detachable camera may be positioned behind the user's head. Additionally, left, and right side wired/wireless cameras may be used to communicate with the display base to produce a plurality of images for the user to select from. Each camera may have its own lighting sources within its enclosure. Each camera may also provide a light sensor capability to sense the ambient light, the reflected light, and auto focus the camera's lenses, if any, in order to produce the user's desired displayed views.

The digital mirror may also be used to store or archive pictures for future comparisons. The user may also select a number of stored images in the digital mirror to be shown in a continuous manner similar to a slide show. The growth or development of a user may be displayed by capturing facial changes over the years. The captured image frames may be correlated a displayed as a movie or video. The camera may be used to take individual pictures, single image frame, or record video (a plurality of image frames over a time period) depending on the amount of storage available. Subsequently, the user may elect to show pictures for the purpose of decor, such as a digital picture frame.

A wireless interface allows a user to store pictures and or movies on a remote computer system and transmit them to the digital mirror in the form of a stream file. The digital mirror may also send pictures back to the remote computer system for archival and or further editing or manipulation.

A built-in image signal processor allows the captured images on the digital mirror to be manipulated. This allows the user to enhance their characteristics, such as to reduce wrinkles or remove skin blemishes for example. Selective control of the lighting intensity can also improve the image quality captured by the digital mirror.

Example Digital Mirror System

A digital mirror is an apparatus that captures and displays an image to a user through the use of a digital electronic system. The digital mirror includes an image capture device and a display device on the same side to display the captured image to a user. A digital mirror further includes a user interface and an internal electronic control and image processing system to control the camera and the display device and process captured images for display on the display device.

A digital mirror has a number of advantages over an optical mirror. A digital mirror provides a user with an improved mirror viewing experience compared to a conventional reflective optical mirror through the capabilities of digital imaging. A traditional optical mirror is limited by the ambient environment such as physical location, lighting, and viewing angle of the user. A poorly lit environment can significantly influence the image seen by a user. The user is also limited by their own vision being able to see only in a direct line of sight. A traditional optical mirror is limited in that it can only display to the user a mirrored or reflected image. A digital mirror can overcome one or more of these limitations.

The influence of asymmetry in humans plays a large role in how we view ourselves and how the rest of the world views us. A digital mirror has an ability to show the user a true-life image of how others see them, rather than a mirrored image. In one embodiment of the invention, a freeze frame capture or video replay in a true view mode is provided so that users may study themselves without having to remain fixed in one position.

A digital mirror enables the captured image input to be separated from the displayed output. Because the image capture device (e.g., a camera) and the display device are separate devices, the image capture device may be positioned so that the user's desired view may be displayed without changing the user's position. Furthermore, users are not limited to direct line of sight viewing or using multiple mirrors in order to view themselves from different perspectives. The camera or image capture device may include lighting proximately mounted to illuminate the subject. In order to secure the position of the camera without the user holding it, the camera may include a clamp or stand coupled to a flexible arm or an articulating arm.

The digital mirror includes an image processor that allows the manipulation of captured images for display on the display device. The digital mirror may include a digital zoom to zoom in and zoom out of the captured image. The image processor can further adjust the image displayed by compensating for poor lighting, modifying the image displayed so that a user can make themselves look better or more realistic, or perform any number of digital modifications that are possible in the digital imaging field with an image processor.

The digital mirror may provide substantially all the lighting a user needs to capture images. There is no need to adjust the environment to a digital mirror. The digital mirror can adapt to the user's environment. The digital mirror, along with a detachable camera if so equipped, includes or more light sources to illuminate the user within expected distances of use. Exposure and gain of the image capture device can be adjusted to improve image capture and or video displayed to the user.

The digital mirror can store captured images to separate them from the image being displayed by the display device. A user can selectively freeze an image or replay a stored image to see themselves as they were in the past. Users no longer need to hold a position or expression, perform a motion over and over, or hold their eyes open to see themselves as the digital mirror can capture images for later display when a user's eyes are closed.

A digital camera, also referred to as an image capture device, may provide enhanced optics to capture images otherwise not seen by unaided eyes. The image capture device may include an optical lens or a combination of optical lenses with various properties such as: a telephoto lens for a closer view, a wide-angle lens to allow a wider view, or an optical zoom lens to provide both. Utilizing a telephoto lens, an optical zoom view is possible without users having to readjust their face closer to the digital mirror. The optical zoom lens may optically zoom in and out on the user to select a frame of for captured images for display on the display device of the digital mirror.

A wide-angle lens provides a wide view that can be displayed without the user moving away from the device. The camera may include an auto-focus system to provide sharpness and or resolution, regardless of where the user is positioned relative to the device.

The digital mirror is not limited to only one perspective view. Multiple cameras of a digital mirror can concurrently capture and display more than one perspective view to the user. The additional captured views can provide a more complete view of the user and or their surroundings. Alternative, additional captured views may be used to provide a side-by-side perspective comparison. The digital camera can display images side-by-side, picture in picture, or in a mosaic on the same display or on separate displays. With an optical mirror, the user previously had to move the mirror or position their own body in order to see a desired viewing angle. With multiple cameras a user can capture different perfect views all at once.

A digital mirror can displace optical mirrors as a decoration in a home or office environment. Because the digital mirror provides its own illumination, it has the ability to capture and display an image, even in poor lighting conditions. The digital mirror can be used in poorly lit rooms within the home, a visor mirror in automobiles at night, or in a plurality of environments in its portable compact version.

Referring now to FIG. 1A, a first digital mirror 100A is illustrated that is wall mountable. The digital mirror 100A includes an enclosure 101 with at least one mounting device, a hole 180 or hooks 182A-182B in its backside, so that the digital mirror can be mounted to a wall 189. The digital mirror 100A further includes one or more selective light sources 102, an image capture device 104 (also referred to as a camera), a display device 106, a light diffuser 112, a user interface 115, and an image processing and control system (see the control systems 600A-600B illustrated in FIGS. 6A-6B) mounted in or to the enclosure 101.

The digital mirror 100A may further include an alternating current (AC) power cord 108 to receive power from an AC power source. The alternating current (AC) power is provided for the lights, camera, and imaging electronics through the AC power cord 108.

The image capture device 104 may be an OMNIVISION™ OV3642 three-megapixel CAMERACHIP™ sensor with a fixed focal length lens in one embodiment of the invention, for example. In this case, a digital zoom may be used to zoom in and/or zoom out on a portion of an image. Alternatively, a camera module with an optical zoom may be used that mechanically moves lenses in a linear manner back and forth, such as commonly found in point and shoot digital cameras, or a camera module with a more compact zoom may be used.

The display device 106 may be a liquid crystal display (LCD) device or an organic light emitting diode (OLED) display device. The display device 106 provides the viewing medium for the user to observe one or more desired images captured by the camera 104. Surrounding the display device 106 is the selective light sources 102 that may be one or more of light emitting diodes (LED), incandescent, florescent, or any combination of light source that can provide light and illuminate a user. The lighting provided by the light sources 102 of the digital mirror may be responsive to the environment (e.g., ambient lighting) and one or more user preferred settings (e.g., automatic light sensing, manual light control) that are stored and provided to the digital image processing control electronics.

The light diffuser 112 is mounted to the enclosure to cover over the light sources 102. The light diffuser 112 diffuses or scatters the light generated by the light sources 102 in order to produce a softer light for the object or user in the target viewing area. The light diffuser 112 minimizes glare and other lighting aberrations that may tend to wash out or distort images captured by the image capture device 104 (also referred to as a camera). The light diffuser 112 may be shaped similar to the enclosure 101 and has an opening 113 to be mounted around the shape of the display device 106. In one embodiment of the invention, the enclosure and the display device are rectangular in shape such that the light diffuser 112 has a frame shape with a rectangular opening 113 (see FIG. 1C). In another embodiment of the invention, the enclosure and display device are oval shaped such that the light diffuser 112 also has an oval frame shape with an oval opening. The light diffuser 112 may include an opening around the camera to allow the capture of images in the field of view of the front side of the digital mirror.

In FIG. 1A, the camera 104 can be located just above the display device 106 near a notched-out area of the selective lighting 102 and light diffuser 112. To minimize parallax and ensure the user can obtain the desired angle of view, the camera 104 is mounted as close as possible to the display device or under/over the display device. For example, the camera 104 may be centered within the display device 106 in order to minimize parallax. The camera 104 may also be mounted over/under display device 106. Digital imaging software may be used to compensate for the pixels in the display device 106 that are covered or interrupted by the camera. The number of pixels covered by the camera may be determined from the size of the camera and depth of field required for the digital mirror 100A.

The digital mirror 100A further includes a touchscreen user interface (UI) 115 mounted over the display device 106. The touchscreen UI 115 provides the user the ability to select the preferred image from a user interface menu. The touchscreen UI 115 may use capacitive sensing, surface acoustic wave (SAW), or resistive touchscreen technology. The user interface 115 may include a view mode button 115A, a zoom in button 115B to magnify a portion of the image, a menu selector button 115C, a zoom out button 115D to demagnify a portion of the image, and a light source dimmer/brightness button 115E to manually adjust the light intensity. The view mode button 115A allows a user to select between a true view mode or a mirror view mode and the display of images as either true view images or mirrored images, respectively. The menu selector button 115C initiates a menu to be displayed on the display device 106 from which a user can select different control functions, such as camera control functions, display control functions, lighting control functions, and power control functions. A user may pan the image through the touch screen user interface as well. A power on/off switch/button may be included as part of the interface. Alternatively, a sensor may be used to automatically power on and off the digital mirror. While the user interface 115 may be a touchscreen UI as described, other types of user interfaces may be used with a digital mirror such as a gesture recognition user interface, a voice recognition user interface (e.g., microphone, voice recognizer/decoder, speaker to question/acknowledge), an electro-mechanical user interface (e.g., buttons, switches, etc.), or a graphical user interface with a pointer, such as a mouse or stylus.

The enclosure 101 provides a housing for the components of the digital mirror. The shape and form factor of the enclosure 101 may set some of the shapes of the components and some of the characteristics of the digital mirror 100A. For example, the shape of the enclosure 101 may be rectangular and the shape of the display device 106 may be rectangular as well. The shape and form factor of the enclosure may influence the mounting positions of other elements as well, such as the positioning of the selective lighting 102.

Figure 1B:
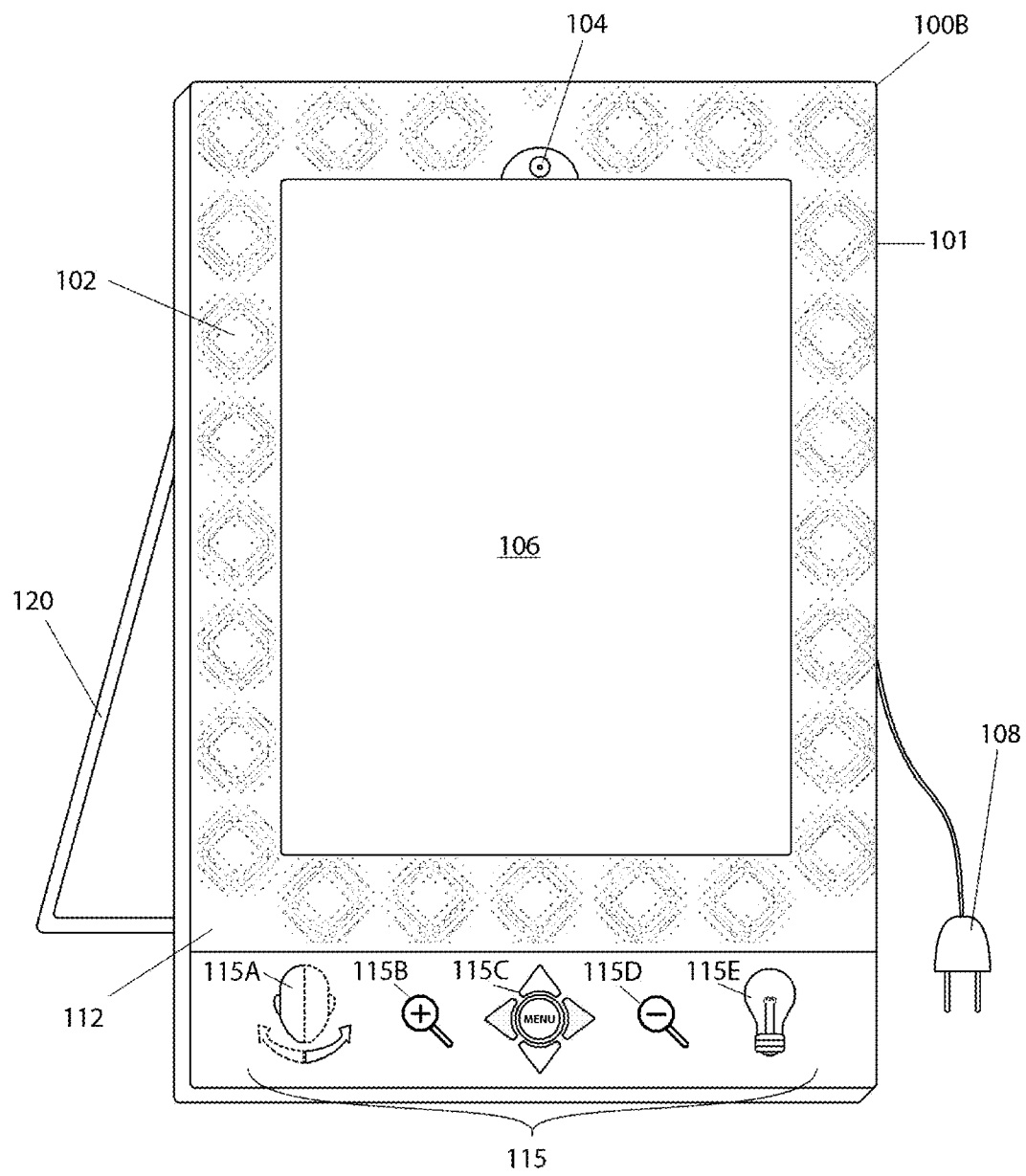
FIG. 1B illustrates a perspective view of a stand-able digital mirror in accordance with another embodiment of the invention.

Referring now to FIG. 1B, a second digital mirror 100B is illustrated that stands up and is self-supported upon a vanity or desktop surface. The digital mirror 100B receives AC power for the lighting, the digital imaging electronics, and the display through the AC power cord 108. The digital mirror 100B includes an enclosure 101 that has a pivotal stand 120. The pivotal stand 120 stands the digital mirror up upon a surface. The pivotal stand 120 can pivot to adjust its angle with the enclosure to provide flexibility in adjusting the angle and height of the mirror to the user's position. The display device 106 is mounted in the enclosure 101. The display device 106 may be an LCD display, a plasma display, an OLED display, or any other type of image display medium.

The camera 104 is located near the top and in front of the display to minimize parallax. The digital mirror 100B includes light diffuser 112 to scatter the light from the device light source 102 surrounding the display device 106. The enclosure 101 houses the display device 106.

The user interface 115 provides the user the ability to select a desired view. The user interface 115 may be an electromechanical user interface and include a view mode button 115A, a zoom in button 115B, a menu selector button 115C, a zoom out button 115D, and a light source dimmer/brightness button 115E. The view mode button 115A selects between true view mode and mirror view mode to display images as a true view image or a mirror view image, respectively. The menu selector button 115C initiates a menu to be displayed on the display device 106 from which a user can select different control functions, such as camera control functions, display control functions, lighting control functions, and power control functions. The menu also allows a user to select and save user preferred settings, such as for lighting, views etc.

Referring now to FIG. 1C, an exploded view of a digital mirror is shown including an enclosure 101 with a pivotal stand 120, an electronics controller board 175 that has circuits and components mounted on a printed circuit board (PCB), one or more light sources 102 to provide lighting, the user interface 115 buttons that control the image display and user menu, a device display 106, and a light diffuser 112 with opening 113. The electronics controller board 175 is mounted in the enclosure under the display device 106. One or more of the components and circuits of the imaging control systems shown in FIGS. 6A-6B and described herein may be mounted on the electronics controller board 175.

The display device 106 is an LCD display with LCD backlighting 116. The image capture device 104 is shown separate from the enclosure. The display device 106 and camera or image capture device 104 are connected to the electronics board 175 via ribbon cable. Covering the enclosure is the light diffuser 112 with an opening 113. The light diffuser 112 is mounted over light source 102. The user interface bezel 125 includes icons that mount over and protect the user interface buttons 115.

The lighting sources 120 for the digital mirror are preferably a plurality of light emitting diodes due to their low power characteristics and ease in adjusting brightness or the light intensity.

Figure 2A:
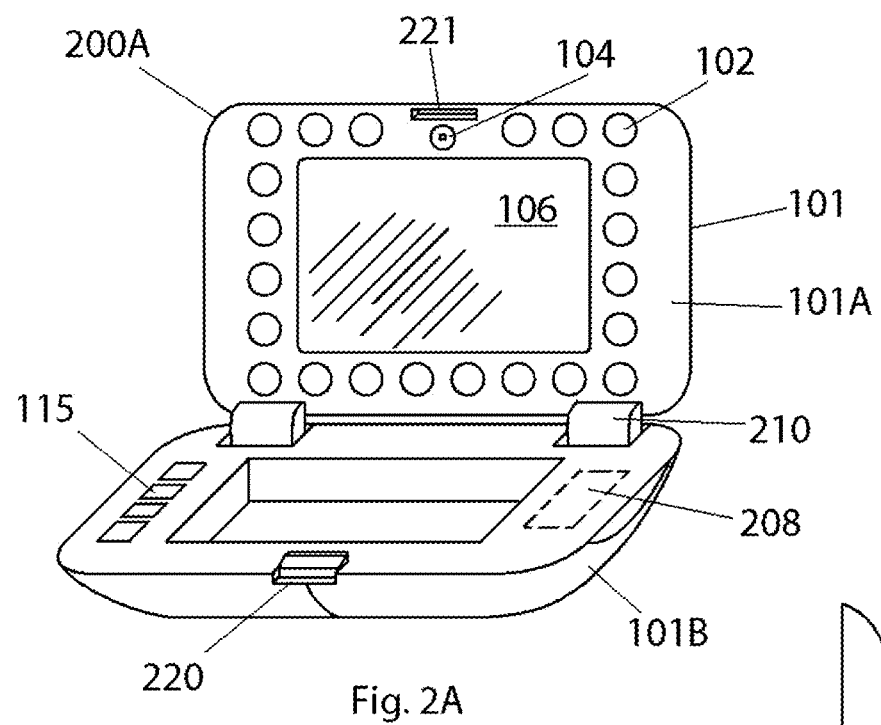
FIG. 2A illustrates a perspective view of a portable digital mirror in accordance with another embodiment of the invention.

Referring now to FIG. 2A, a compact portable digital mirror 200A is illustrated. The compact portable digital mirror 200A is powered by a direct current (DC) power source provided by one or more batteries 208 mounted in a second enclosure half 101B of the enclosure 101. The enclosure 101 includes a first enclosure half 101 and the second enclosure half 101B pivotally coupled together by a hinge 210 like a clamshell.

The compact portable digital mirror 200A further includes the enclosure 101, a display device 106 mounted in the first enclosure half 101A, one or more light sources mounted in the first enclosure half 101A around the display device; a camera 140 (also referred to as an image capture device) mounted in the first enclosure half adjacent the display device 106; and a user interface 115 mounted in the enclosure. In one embodiment of the invention, the display device 106 is a liquid crystal display (LCD device and the one or more light sources are light emitting diodes (LEDs).

The camera 104 is located near the top of the first enclosure half 101A to be in the field of view of a user looking into the display device. The enclosure 101 includes a hinge 210 coupled to the upper and lower half of the enclosure to allow it to pivot open and closed. The first enclosure half 101A includes a catch 221 and the second enclosure half 101B includes a latch 220 to receive the catch 221. When engaged, the latch and catch releasably keep the two enclosure halves 101A-101B pivotally coupled together when the digital mirror is not in use.

The user interface 115 for the portable digital mirror 200A may be a single electro-mechanical button that is responsive to the number of times the button is toggled. For example, depressing the button in rapid succession three times may execute a change in the rotation of the view angle. Alternatively, holding the button down may increase the LED lighting 102 brightness to a peak illumination and then start to decrease the brightness. Once the desired level of brightness is achieved, the user can let go of the button.

Figure 2B:
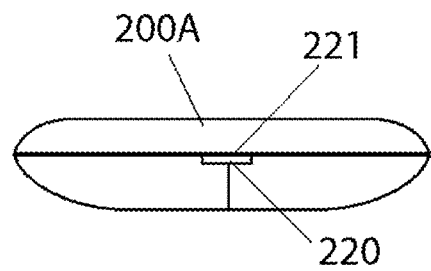
FIG. 2B illustrates a front closed view of the portable digital mirror in FIG. 2A.

Referring now to FIG. 2B, a front view of the compact portable digital mirror 200A is shown in a closed position. The latch 220 and catch 221 are releasably engaged to keep the two enclosure halves 101A-101B closed together.

Figure 2C:
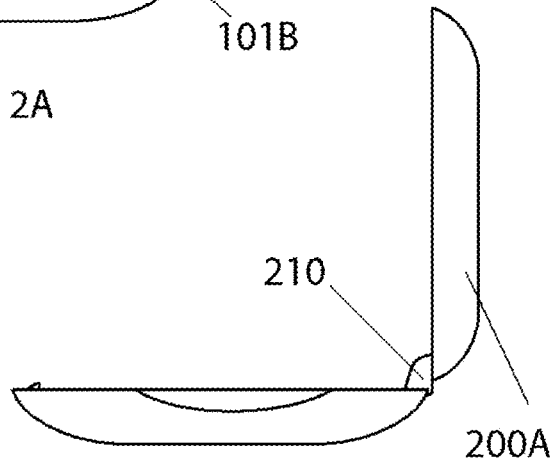
FIG. 2C illustrates an open side view of the portable digital mirror shown in FIG. 2A.

FIG. 2C illustrates a side view of the compact portable digital mirror 200A in an open position. FIG. 2C better shows the hinge 210 coupled between the enclosure halves 101A-101B.

Figure 2D:
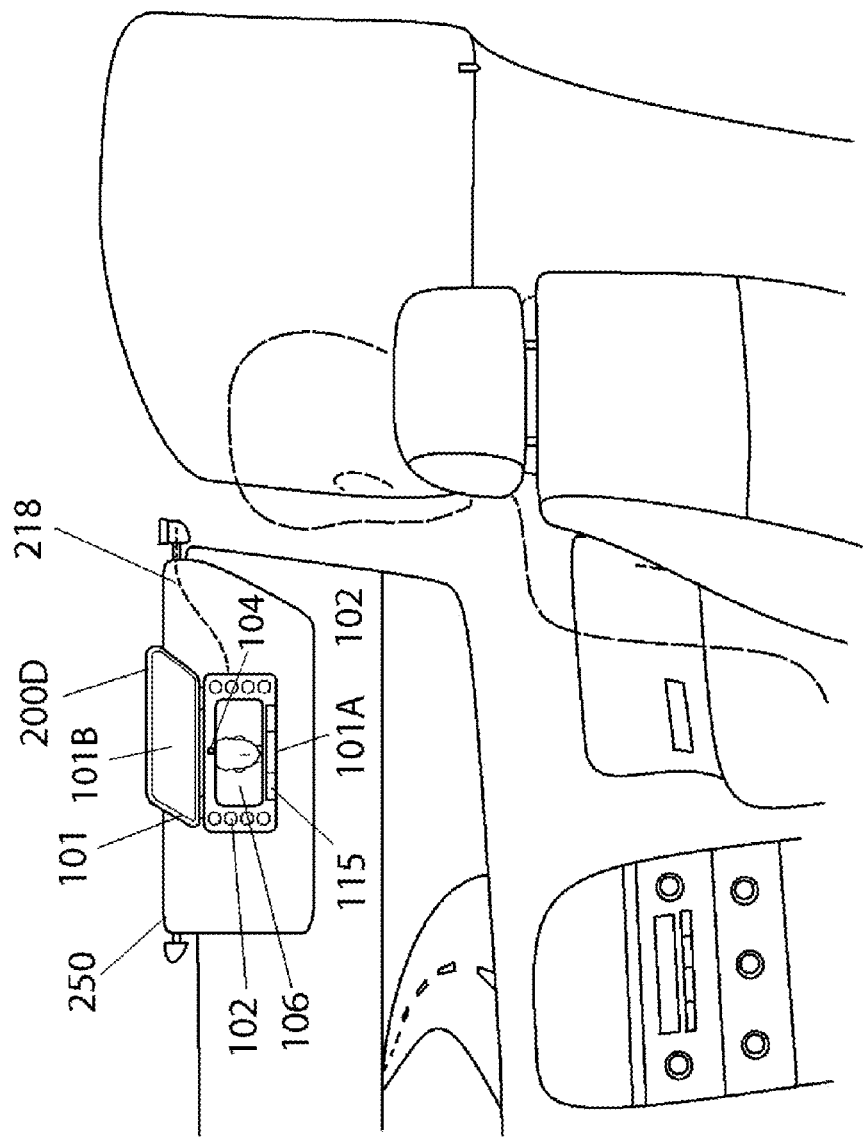
FIG. 2D illustrates a visor digital mirror in an open position attached to a sun visor of an automobile.

Referring now to FIG. 2D, a visor digital mirror 200D is shown coupled to an automotive sun visor 250. The visor digital mirror 200D may include enclosure halves 101A-101B that flip open and closed like those of the digital mirror 200A or alternatively, a slidable cover that slides open and closed over the display device in the enclosure half 101A. In either case, the second enclosure half is moveably (e.g., pivotally or slidingly) coupled to the first enclosure half. The enclosure half 101A is mounted to the sun visor 250 and rests thereon when folded up away into the ceiling of the car.

When enclosure half 101B is flipped open to reveal the display device 106, a switch may automatically power on the digital mirror. When flipped closed to cover over the display device 106 to protect it from dirt and whatever else, the switch may power off the digital mirror. The slidable cover may slide open to reveal the display device 106 and power on the digital mirror and slide closed to cover over the display device 106 and power off the digital mirror. The digital mirror 200D is powered through a wire cable 218 connected to the automobiles direct current power supply having a nominal twelve (12) volts DC.

The digital mirror includes the display device 106 mounted in the first enclosure half 101A, a camera (also referred to as an image capture device) 104 mounted in the first enclosure half 101A, one or more light sources 102 mounted in the enclosure half 101A on the left and right sides of the display device 106, and the user interface 115 mounted in the first enclosure half 101A. The second enclosure half 101B protects the digital mirror 200D when not in use. The second enclosure half 101A houses the components of the digital mirror 200D and provides a means to mount it to the sun visor 250D.

Figure 3A:
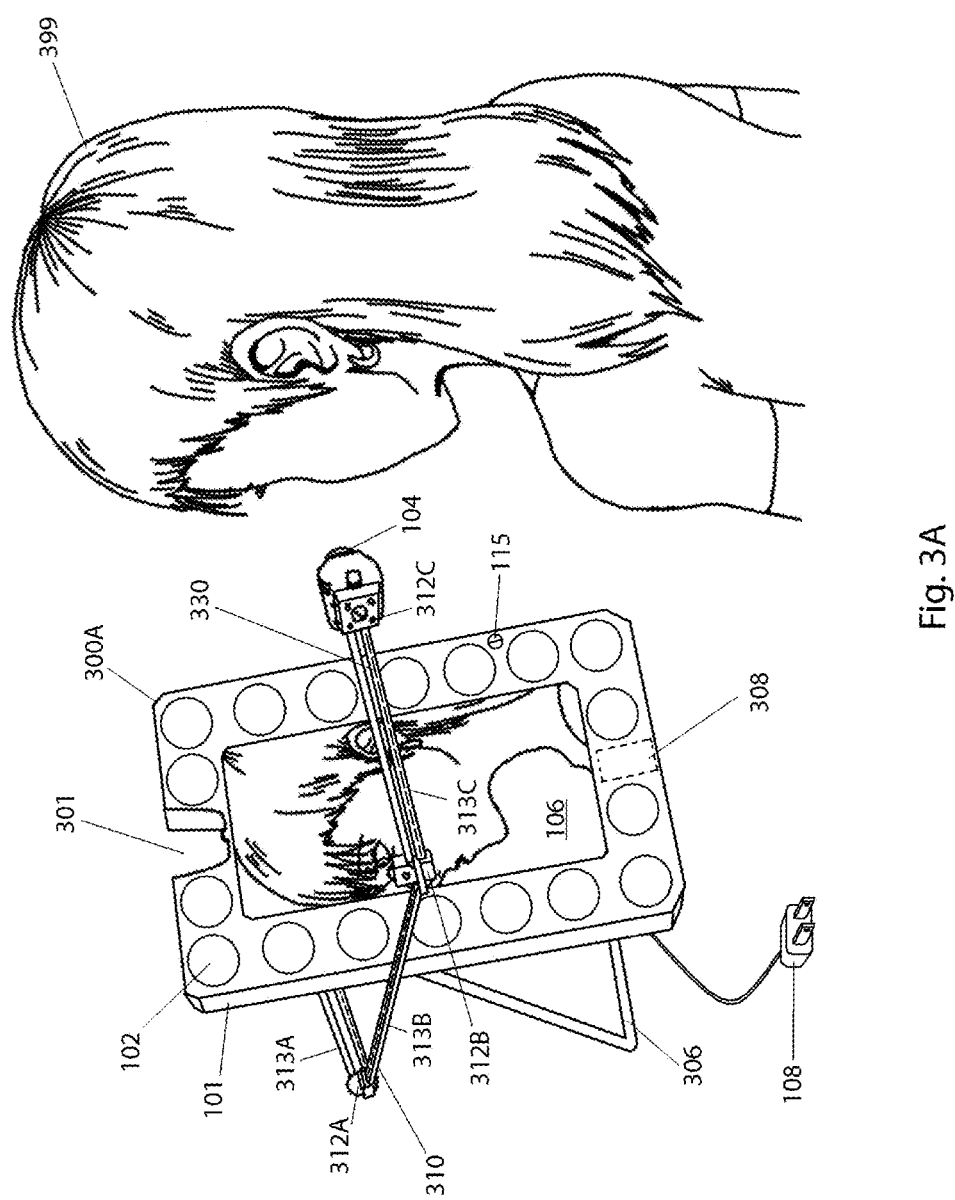
FIG. 3A illustrates a perspective view of a stand-able digital mirror with a movable camera.

Referring now to FIG. 3A, a digital mirror 300A is now illustrated capturing an image of a user 399 that is displayed on the display device 106. The digital mirror 300A is a rechargeable, self standing digital mirror including a pivotal stand 306 and rechargeable batteries 308. The pivotal stand 306 is pivotally coupled to a back side of the enclosure 101 to support the digital mirror on surface.

The digital mirror 300A further includes a detachable camera 104 that is coupled to the enclosure 101 by an articulating arm 310. The camera 104 is mounted at the distal end of the arm 310. The proximal end of the arm 310 is coupled to the enclosure 101. One or more lights 102 that may be mounted adjacent the camera 104 to provide lighting in front of the digital camera 104 to facilitate the capture of images, such as shown by FIG. 3D. A camera cable 330 may couple the camera 104 to the underlying image processing system (see FIG. 6A) to provide power and control signals and receive pixel data for each image frame captured. Alternatively, wireless transmitter/receivers may be used to send the captured images to the underlying image processing system (see FIG. 6B) mounted in the enclosure 101.

The pivotal stand 306 may be pivoted to a different angle in order to adjust the viewing angle and capture desired images for display on the display device. Furthermore, the articulating arm 310 provides a plurality of degrees of freedom to allow the user 399 to position the camera 304 mounted thereto at various positions to capture desired images for display on the display device. The articulating arm 310 includes a plurality of links 313A, 313B, and 313C coupled together by a plurality of joints 312A, 312B, and 312C. The links in combination with the joints provides a very flexible arm that enables the user to position the camera in a plurality of viewing angles. In another embodiment of the invention, the articulating arm may be a flexible arm with a plurality of joints coupled together so that it can flex into different positions.

The digital mirror 300A includes an enclosure 101 with a recess 301 that receives the detachable camera 104. The detachable camera 104 can be positioned within the recess 301 to capture images at a fixed position adjacent the display device 106 or to stow away the camera for storage of the mirror 300A.

The digital mirror 300A further includes the one or more light sources 102, the display device 106, the rechargeable batteries 308, and the user interface 115 mounted in, coupled to, and/or operational within the enclosure 101. A description of various types of light sources 102, display devices 106, and user interfaces 115 that may be used are described elsewhere and incorporated herein by reference.

The power supply (see the power supply block 618 in FIGS. 6A-6B) of the digital mirror may include a battery charger to recharge the rechargeable batteries 308. The battery charger receives alternating current (AC) power through the AC power cord/plug 108 when coupled to an AC power outlet. The AC power source may also be used to power the electrical components in the digital mirror while the rechargeable batteries are being charged or if the rechargeable batteries are missing.

Figure 3B:
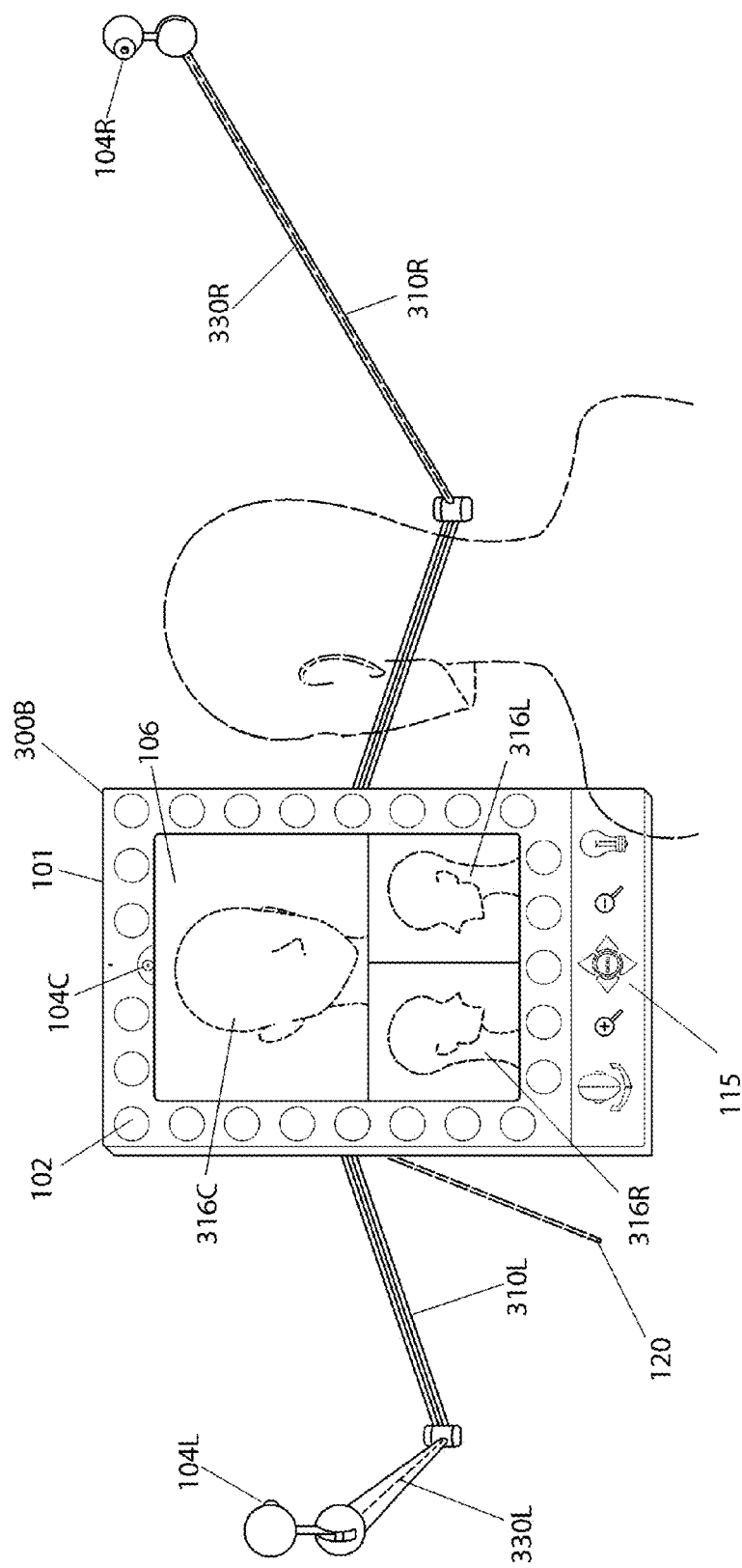
FIG. 3B illustrates a perspective view of a stand-able digital mirror with a fixed center camera and left and right-side moveable cameras.

Referring now to FIG. 3B, a digital mirror 300B is illustrated that includes a plurality of cameras—a left camera 104L, a center camera 140C, and a right camera 104R. The digital mirror 300B is self-supporting including an optional stand 120 and/or means to be wall mounted (e.g. hole 180 or hooks 182A-182B shown in FIG. 1A) so that it can capture images hands-free, without the user having to hold any camera. One or more lights 102 may be mounted adjacent each of the left camera 104L and the right camera 104R, such as shown by FIG. 3D, to provide lighting in front of each and facilitate the capture of images. One or more lights 102 may also be mounted around the display device 106 to provide lighting in front of the display device to facilitate the capture of images.

The digital mirror 300B includes additional cameras so that the user can concurrently capture and then display images of different views from various fields of view. For example, the left camera 104L may capture a left side view of a user, the center camera 140C may capture a front side view of the user, and the right camera 104R may capture a right-side view of the user concurrently. The digital mirror 300B can also concurrently display left side images 316L captured by the left camera 104L, front side images 316C captured by the center camera 140C, and right-side images 316R captured by the right camera 104R in a mosaic arrangement on the display device 106, in response to a selection by the user with the user interface 115. The digital mirror 300B can also display these images separately on the display device 106 in response to a selection by the user through the user interface 115. The left side images 316L, the front side images 316C, and the right-side images 316R displayed in the mosaic arrangement may all be live images continuously captured by the cameras and displayed on the display device 106. Alternatively, one or more of the left side images 316L, the front side images 316C, and the right-side images 316R displayed in the mosaic arrangement may be stored images previously captured by the cameras and read out from a storage device. For example, the front side images 316C may be live images while the left side images 316L and the right-side images 316R may be stored images read out from the storage device and displayed on the display device.

The center camera 104C is mounted to the enclosure 101 adjacent the display device 106 to reduce parallax. The center camera 104C captures a frontal view of the user or alternatively, a back view of the user if the user rotates himself/herself around so his back faces the center camera. For example, the user shown in FIG. 3B facing the camera 104C and the display 106 could turn around so that the back of their head is facing the camera 104C. After capturing and storing a few frames of images of the back of their head, the user can turn back around and select with the user interface 115 to recall the captured images of the back of their head for display on the display device 106. Similarly, frames of left and right-side images may be captured with the left and right cameras 104L,104R respectively and stored in a storage device (e.g., see storage device 644 in FIGS. 6A-6B) of the digital mirror. The user can then select through the user interface 115 to recall the captured images of the one more sides of their head for separate or concurrent display on the display device 106 to provide a more complete view of themselves.

The left camera 104L and the right camera 104R are respectively mounted to the distal ends of a left articulating arm 310L and a right articulating arm 310R, respectively. The proximal ends of the left articulating arm 310L and the right articulating arm 310R are coupled to the left and right of the enclosure 101, respectively. The left camera 104L and the right camera 104R are electrically coupled to the image processing system (See FIGS. 6A-6B) by cables 330 extending through the arms 310L,310R. The cables 330 may be electrical wire cables or optical fiber cables to couple the cameras 104L,104R and image processor system electronics together. In an alternate embodiment, the cameras 104L, 104R may be wireless cameras and communicate with a wireless digital mirror base with a wireless communication protocol as described herein.

Figure 3C:
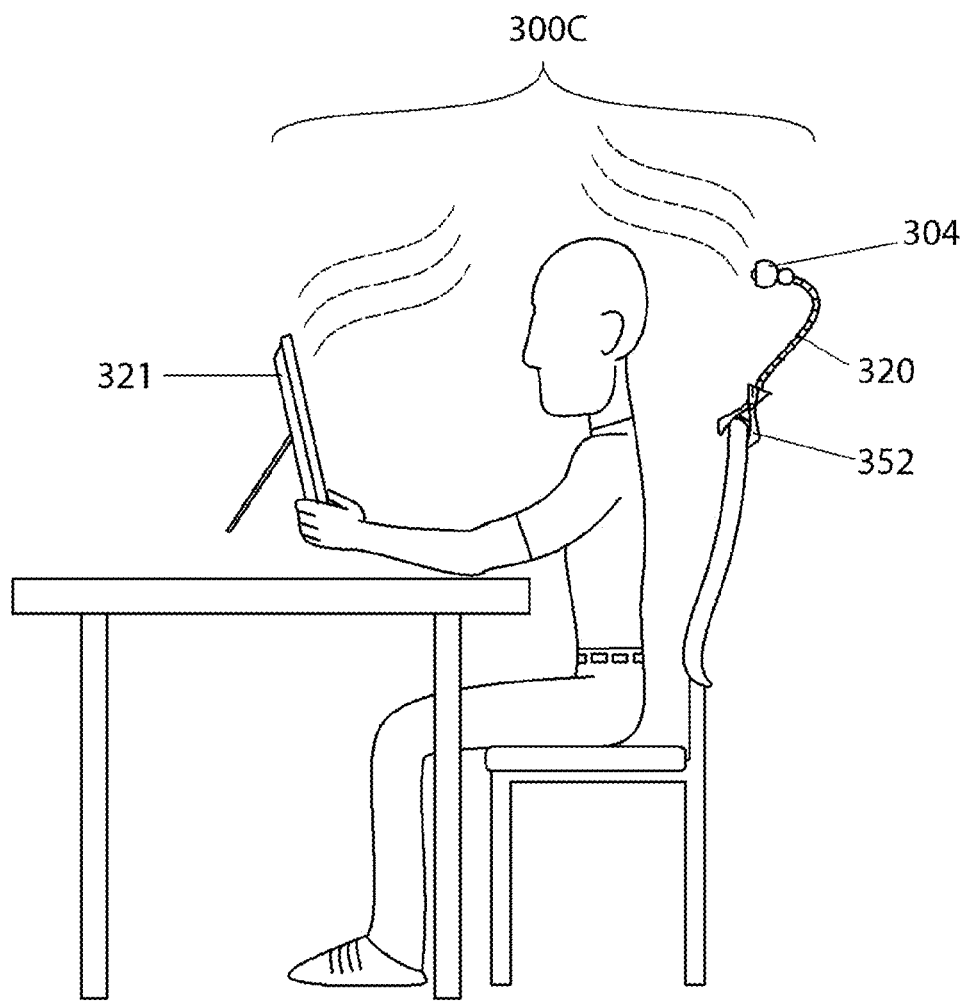
FIG. 3C illustrates a perspective view of a stand-able digital mirror system including a detachable camera.
Figure 3D:
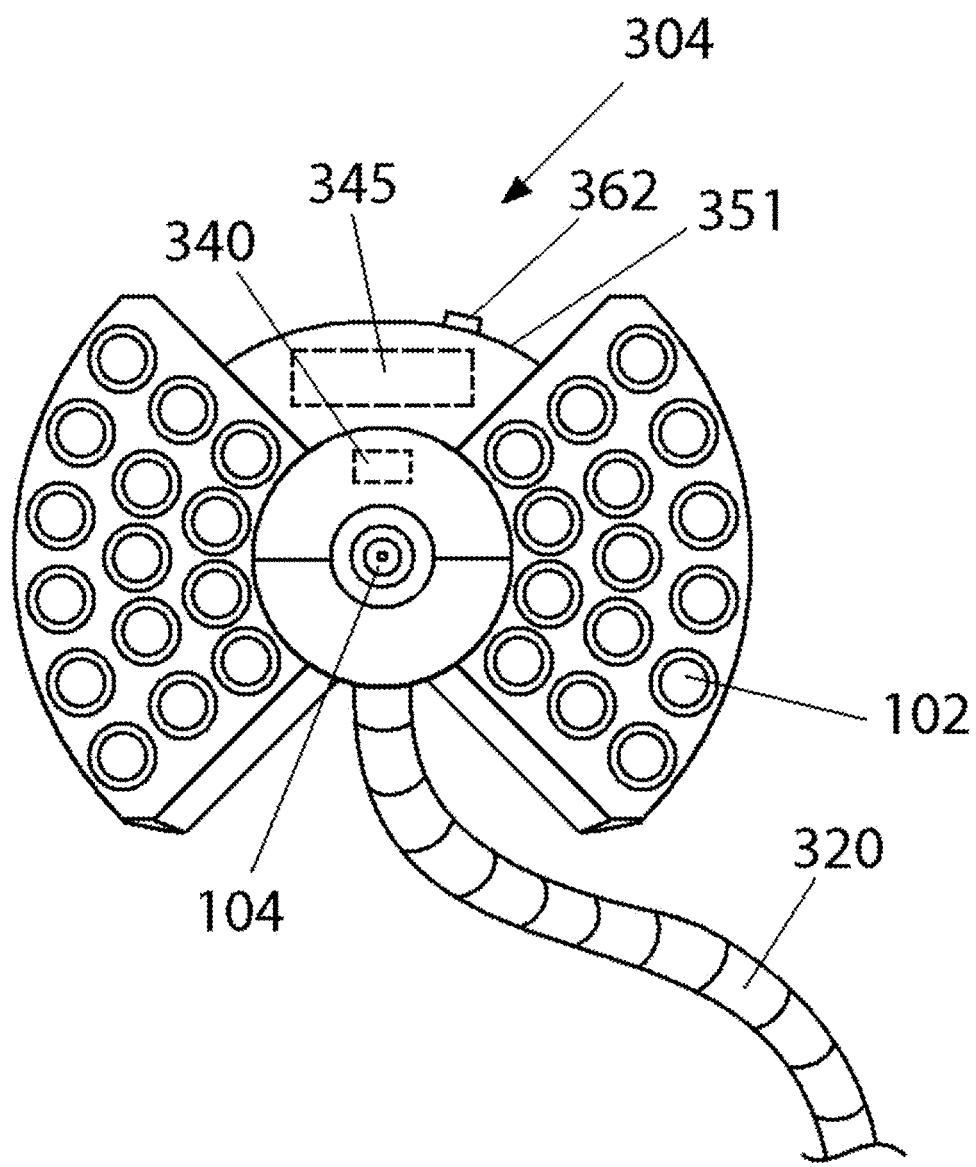
FIG. 3D illustrates a magnified view of a portion of the detachable camera illustrated in FIG. 3C.

Referring now to FIG. 3C, a wireless digital mirror 300C is illustrated. The wireless digital mirror 300C has a wireless digital mirror base 321 and the wireless detachable camera 304. The wireless digital camera 304 may be tethered to the wireless digital mirror base 321 through a wireless protocol such as the common I.E.E.E. 802.11 industry standard. This allows the detachable camera to be placed anywhere without being coupled to the enclosure 101 by an arm. However, the camera 304 may connect to a flexible arm 320 with a stand or clamp 352 to couple to and support the camera above a surface. A user can position the camera 304 when supported by the clamp/stand 352 for a desired viewing angle.

The wireless digital mirror base 321 may communicate wirelessly with a remote computer system to upload captured images through a similar wireless protocol. Pictures and/or video may be transmitted to/or received from the remote computer system by the wireless digital mirror base 321. The wireless digital mirror base 321 may then be used as a picture frame so that pictures and or video may be displayed at the user's discretion. The digital mirror may serve a dual purpose; one for viewing oneself, one of a digital picture frame, and one for saved pictures.

Referring now to FIG. 3D, a magnified view of the wireless digital camera 304 is illustrated. The wireless digital camera 104 includes, an image capture device or camera, one or more adjacent light sources 102, a wireless transmitter 340, and one or more batteries 345 mounted in a housing or enclosure 351. The one or more lights 102 that are mounted adjacent the camera provide lighting in front of the wireless digital camera 104 to facilitate the capture of images. The wireless digital camera 304 is mounted to a flexible arm 320 to flexibly move the position of the camera. The wireless transmitter 340 may include an on/off switch 362 to selectively power on/off the battery 345 power drain when not in use. Alternatively, the wireless transmitter may have a sleep mode that sleeps the digital camera 304 until activated upon receipt of a signal to turn on from the wireless digital mirror base 321. While the camera 304 has been described as being a wireless digital camera, it may instead be tethered to and in communication with the digital mirror base 321 by a wire cable including a plurality of wires.

Figure 3E:
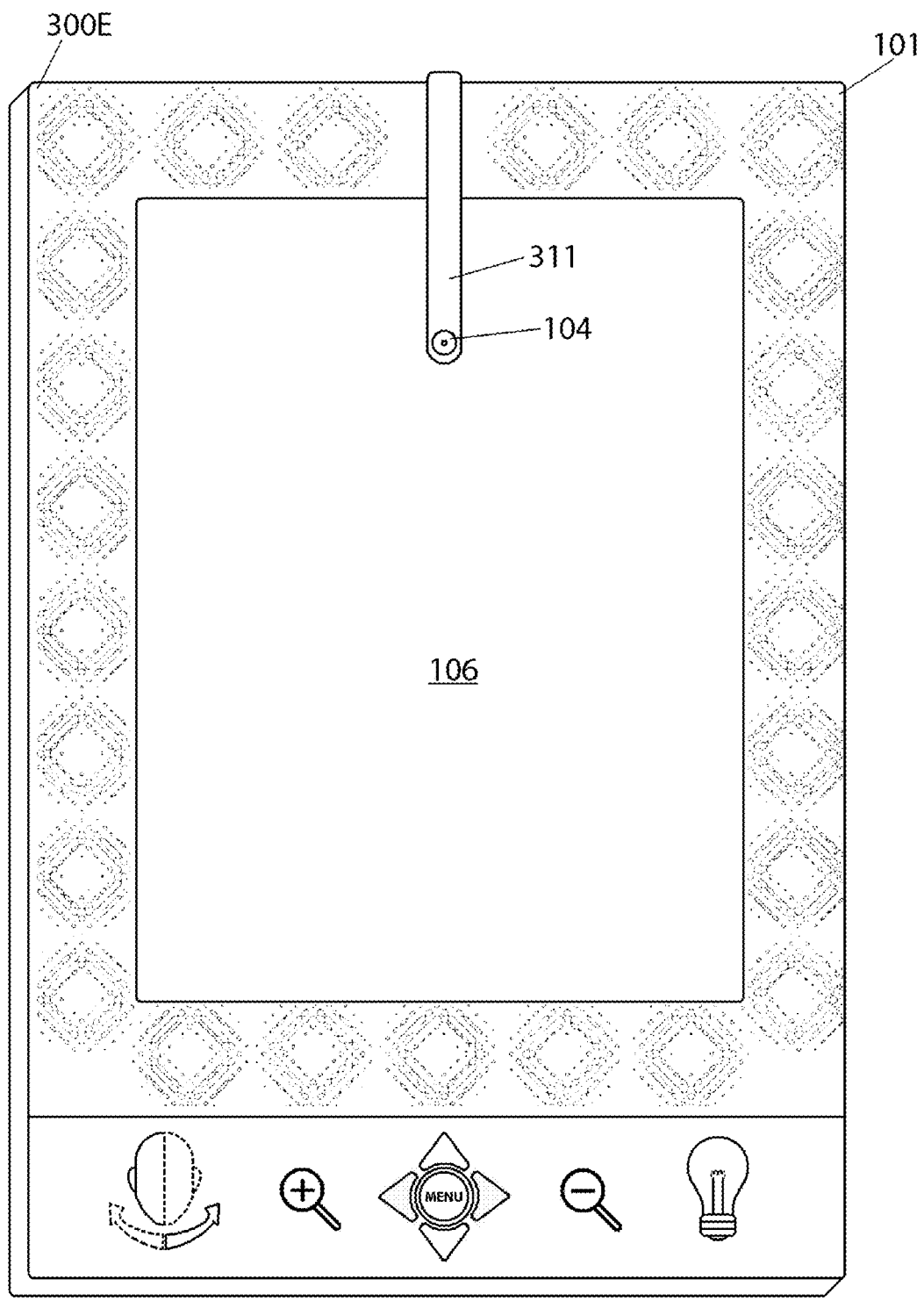
FIG. 3E illustrates a digital mirror having a camera mounted over the display device to minimize parallax.
Figure 3F:
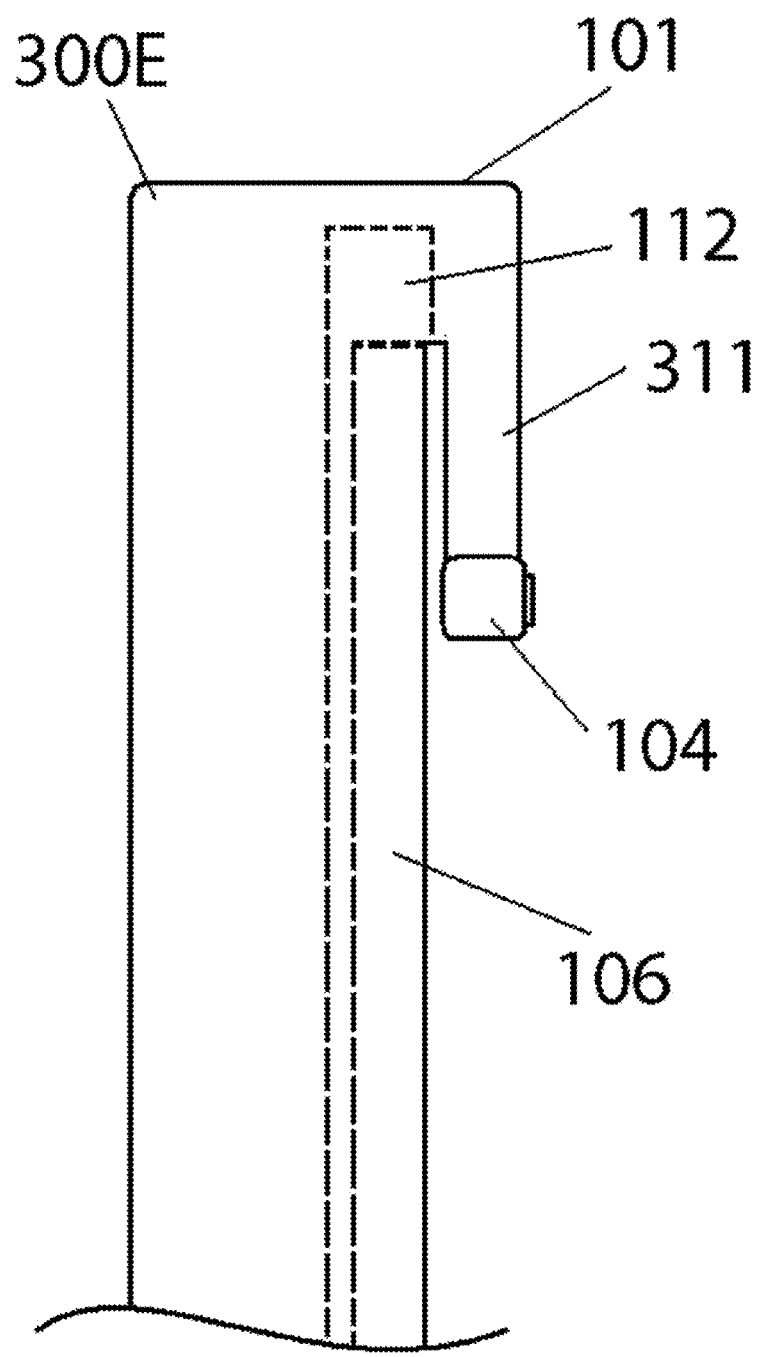
FIG. 3F illustrates a cross-section of a portion of the digital mirror illustrated in FIG. 3E.

Referring now to FIGS. 3E-3F, a digital mirror 300E is shown. The digital mirror 300E includes a digital camera 104 mounted over the display device 106 to reduce parallax. The enclosure 101 may include a protrusion or arm 311 to support the camera 104 over the display device 106. The mounting of the camera 104 over the display device can be seen more clearly in the magnified side view shown in FIG. 3F.

In FIG. 3F, the camera 104 is mounted to the protrusion 311. The protrusion 311 is molded as part of the enclosure 101 to support the camera 104 over the display device 106. Portions of the display device 106 and the light diffuser 112 are shown in FIG. 3F to illustrate the relative positioning of the elements in the digital mirror 300E.

The digital camera 104 can also be mounted under the display device 106 to reduce parallax. Provisional Patent Application No. 61/338,106 filed on Feb. 16, 2010 by John W. Rowles, et al., entitled TECHNIQUES FOR IMAGE CAPTURE THROUGH LIQUID CRYSTAL DISPLAYS, describes how to mount a camera under a liquid crystal display (LCD) device and capture images. The digital camera may be mounted between an LCD pixel panel and a backlighting panel. Alternatively, the camera may replace a few pixels and be interspersed between pixels of the LCD pixel panel. In another embodiment of the invention, the digital camera 104 can also be mounted under an organic light emitting diode (OLED) display device 106 to reduce parallax. Alternatively, the digital camera 104 may replace a few pixels and be interspersed between pixels of the organic light emitting diodes.

Figure 4B:
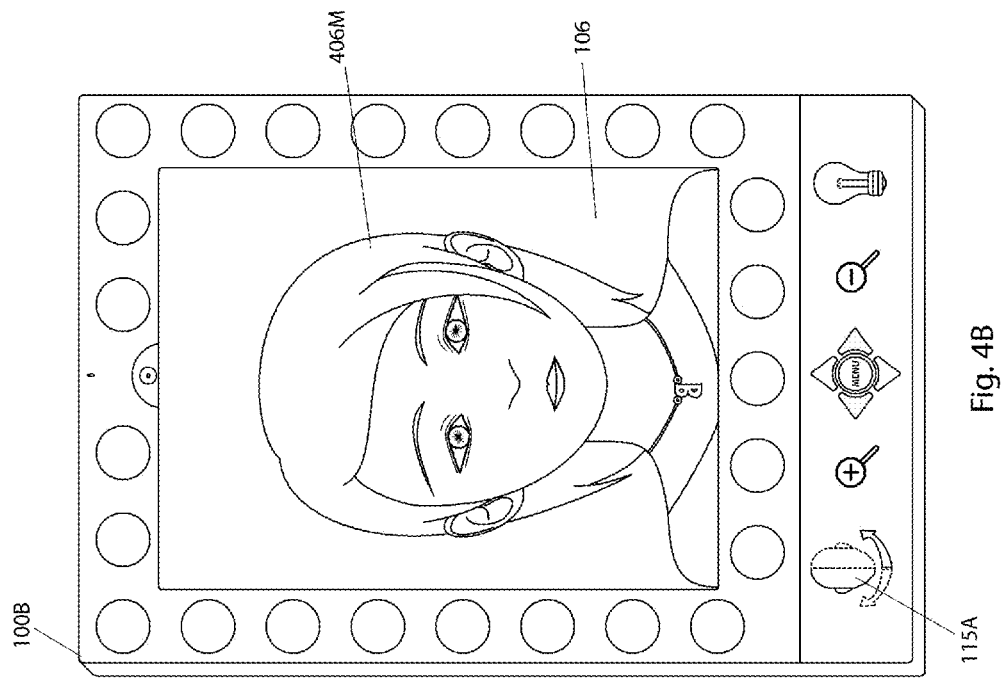
FIGS. 4A-4B respectively illustrate the user-selectability between the true view mode and the mirror view mode with the user interface of each digital mirror.
Figure 4A:
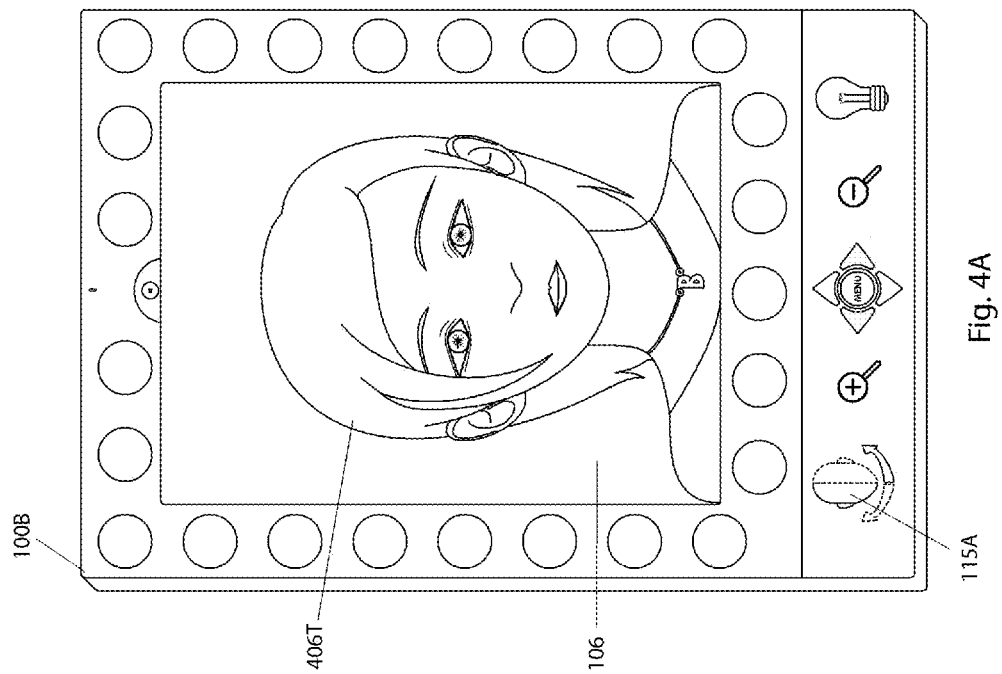

Referring now to FIG. 4A, in response to true view mode being selected through the view mode selector 115A of the user interface, a true view image 406T is displayed by the display device 106 of the digital mirror 100B. A conventional optical mirror does not display the true view image 406T if a user stands in front of the optical mirror. The letter B on the necklace in the true view image 406T has a proper orientation.

FIG. 4B illustrates a mirrored image 406M being displayed in response to the mirror view mode being selected by the user interface view mode selector 115A. A conventional optical mirror may display an image similar to the mirrored image 406M.

Figure 5A:
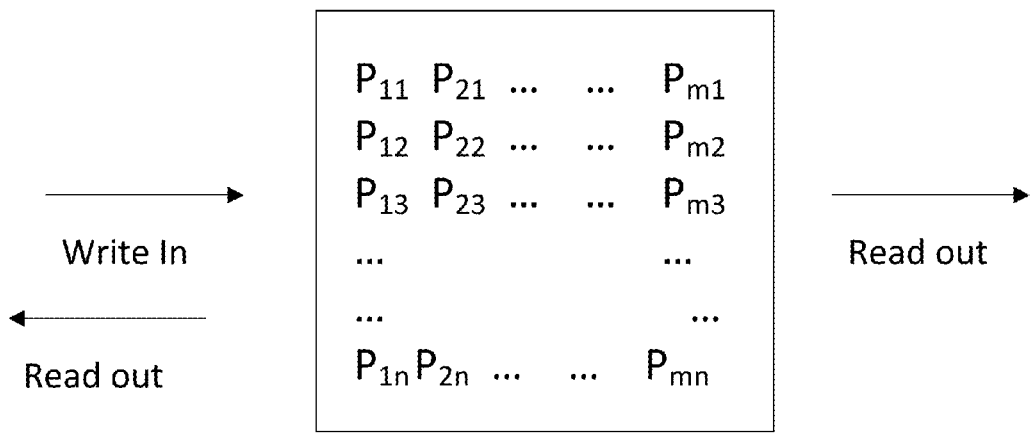
FIG. 5A illustrates a representation of an array of pixel data stored in a frame buffer memory and displayed on a display device of a digital mirror as true view images in a true view mode.

Referring now to FIG. 5A, a representation of a single frame of pixel data configured into columns and rows is illustrated. A frame of pixel data is captured by the image capture device 104 and stored in digital format into the memory locations of a frame buffer memory. A frame of data may write into the frame buffer memory and organized as illustrated in FIG. 5A, such as by writing from left to right (pixel P11 to pixel Pm1). In response to user selections (e.g., true view mode or mirror view mode), the pixel data stored in the frame buffer memory can be readily processed by an image signal processor as desired.

In a true view mode, the frame of data may be read out similarly (e.g., from left to right-pixel P11 to pixel Pm1) and displayed on the display device as shown in FIG. 5A. Pixel P11 is displayed in the upper left corner, pixel Pm1 is displayed in the upper right corner, pixel P1n is displayed in the lower left corner, and pixel Pmn is displayed in the lower right corner. In this manner, the pixel data is displayed on the display device of the digital mirror as it was captured by the image capture device. The true view mode displays true view images to the user as how third persons see the user, such as shown in FIG. 4A.

In a mirror view mode, the frame of pixel data saved into the frame buffer memory is read out differently from how it was written by reversing the addressing of memory locations into the frame buffer memory. The arrangement of the pixel data in the rows and columns is read out of the memory locations in a reverse order (e.g., from right to left—Pm1 to P11) to transpose or horizontally flip the captured image into a horizontally mirrored image.

Figure 5B:
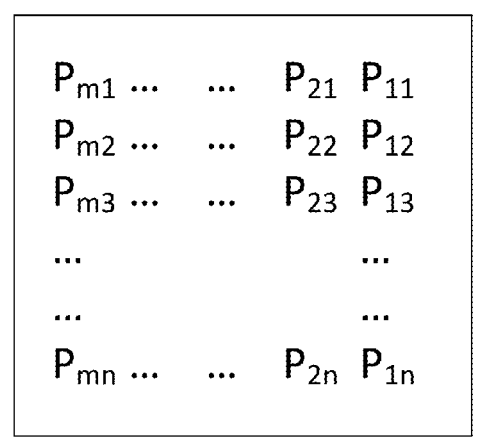
FIG. 5B illustrates how the pixel data stored in a frame buffer, such as shown by FIG. 5A, is read out and displayed on a display device of a digital mirror to provide a mirror view image in a mirror view mode.

FIG. 5B illustrates how the mirrored image is displayed on the display device 106 of the digital mirror in response to the mirror view mode. For example, pixel Pm1 is now displayed in the upper left corner of the display device, pixel P11 is displayed in the upper right corner of the display device, pixel Pmn is displayed in the lower left corner, and pixel P1n is displayed in the lower right corner. The mirror view mode displays mirror view images to the user similar to how an optical mirror does, such as shown in FIG. 4B.

Image Processing and Control Systems for Digital Mirrors

Figure 6A:
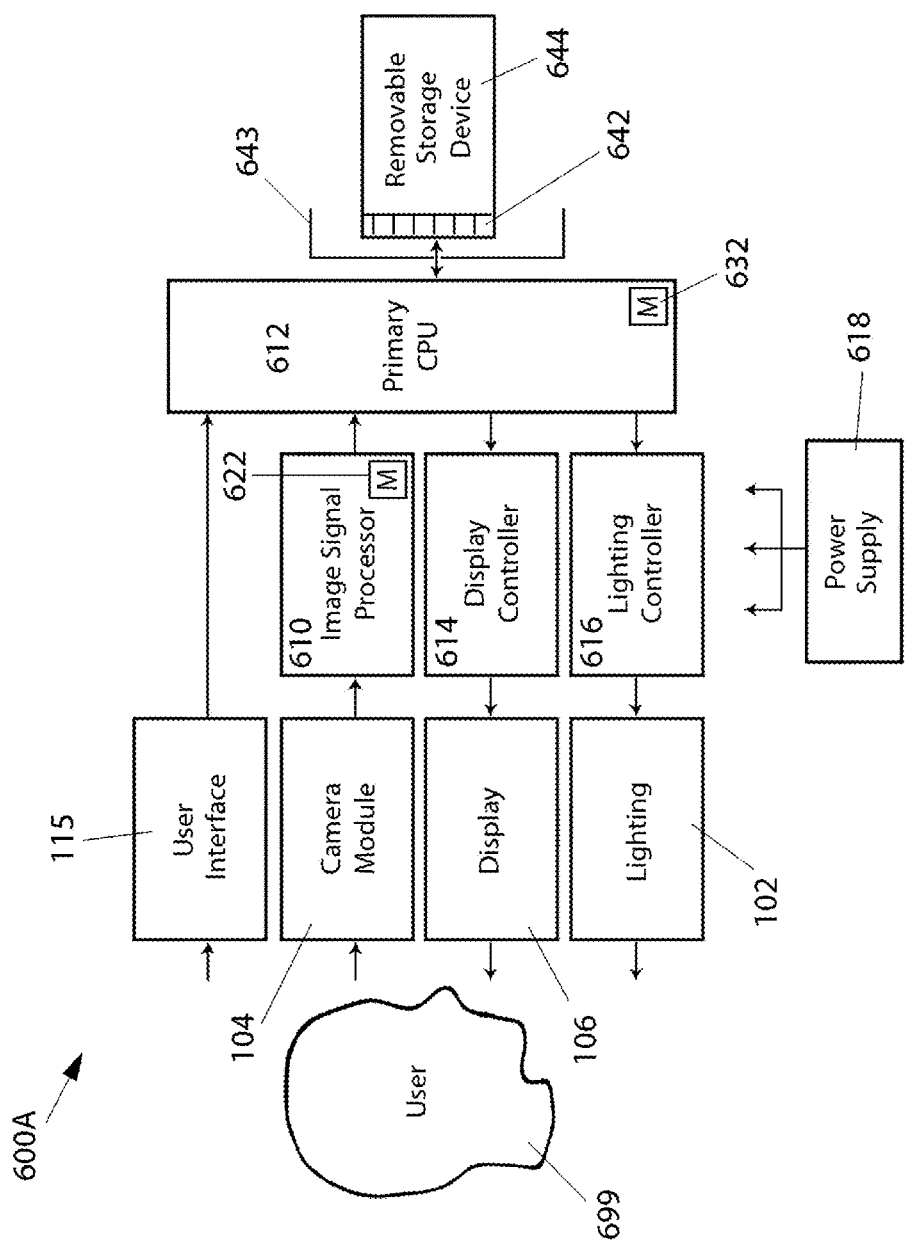
FIG. 6A illustrates an exemplary functional block diagram of electronic circuit modules in an image processing and control system provided in a first digital mirror system.

Referring now to FIG. 6A, a first block diagram an image processing and control system 600A for the digital mirrors is shown. FIG. 6A illustrates a user 699 in front of the camera module 104 to have his/her image captured and displayed by the display device 106 after the captured images have undergone further processing by the image processing and control system 600A. The block diagram shown in FIG. 6A illustrate basic data flow in the system by arrows illustrated between the blocks. The image processing and control system 600A includes one or more of the user interface 115, the lighting sources 102 coupled to a lighting controller 614, an image signal processor 610 coupled to the camera module 104, the display controller 614 coupled to the display device 106, a storage device 644, a power supply 618, and a primary central processing unit (CPU) 612 coupled together as shown.

Some sort of power supply 618 couples to each active device to supply power. The different types of power supplies 618 that may be used include rechargeable batteries, automobile DC power, AC power grid, or a solar panel. In one embodiment of the invention, the power supply 618 includes an auto sensing mechanism to automatically shut off power and/or enter a low power sleep mode after a predetermined period of inactivity and to automatically power on the digital mirror supplying power to the components in response to sensing the presence of a user.

The primary CPU 612 controls substantially all of the functions and sub functions of a digital mirror. The primary CPU 612 may include a frame buffer memory 632 to store one or more frames of pixel data representing an image. The stored data in the frame buffer memory may be ready to or undergoing image processing performed by the primary CPU.

A removable storage device 644 having an edge connector 642 may be coupled to the CPU 612 by means of a socket connector 643. The frame buffer 632 may read image pixel data out from or write image pixel data into the removable storage device 644. In another embodiment of the invention, the removeable storage device may be a fixed storage device to provide additional data storage capacity for the system. Regardless, the storage device 644 may be one or more of different types of computer readable mediums including memory devices, flash drives, or semiconductor storage devices (SSD).

The primary CPU 612 may include one or more processor cores and associated memory required for operation. The processor cores may include microprocessors, microcontrollers, reduced instruction set computer (RISC) processors, networked computer systems, etc. that are capable of executing instructions of software programs.

The user interface 115 of the digital mirror receives a user's requests and sends commands or instructions to the primary CPU 612 for processing. The user interface 115 may be used by a user to control a plurality of functions of the digital mirror through the primary CPU 612. For example, the user interface 115 can be used to control the display controller 614, the lighting controller 616, the image signal processor, and in some cases, the camera module 104, through the primary CPU 612. The user interface 115 may be an electro-mechanical user interface, a graphical user interface, a voice command user interface, a visual command interface or a touchscreen user interface that can be managed through the use of buttons, a microphone and voice recognition, or through a touch-screen system over the display device for example. The primary CPU 612 receives the requests from the user interface and performs the requested tasks.

The display controller 614 controls the features and characteristics of the display device 106. The display controller 614 may receive instructions from the primary CPU 612 to control the display device. The display controller 614 includes the drivers and electrical components required to display images on the display device 106. The type of display device 106 utilized may have different controllable features and characteristics. For example, an LCD display device may have different controllable characteristics than a plasma display device or an OLED display device and require different control signals and drivers. Different display controllers may be matched with the type of display device that is to be controlled.

The display device may be a type of flat panel display that is capable of displaying high quality color video at fast speeds. Examples of flat panel displays include thin film transistor (TFT) (liquid crystal display) LCD devices and organic light emitting diode (OLED) display devices. The display device 106 may have a large viewable angle with a capability of displaying high quality video.

The lighting controller 616 can control the light intensity (brightness) of the lighting sources 102 in response to control signals received from the primary CPU. The type of light sources utilized may have different controllable features and characteristics. Different types of lighting controllers may be matched to the type of light sources being used. Alternatively, the lighting controller may execute algorithms to modify the illumination characteristics depending upon the type of light source 102 being controlled. Exemplary light sources include one or more of florescent, compact florescent, or light emitting diodes (LEDs)—the preferred embodiment of lighting source for the invention.

The image signal processor 610 includes a frame buffer memory 622 to store pixel data of one or more frames of images. Like the primary CPU, the image signal process can perform image processing operations on the pixel data stored in the frame buffer memory in response to software instructions. Additionally, the image signal processor may be used to control the camera module 104 and any sensors mounted in the camera module 104. It is desirable that the image single processor be of sufficient speed/data bandwidth to manage a video stream of a plurality of frames of pixel data in order to capture video images and display video on the display device. The image signal processor 610 may process image data on its own or in conjunction with the primary CPU 612 before it is displayed on the display device 106 by the display controller 614.

The camera module 104, also referred to as an image capture device, may include a lens system, an image sensor, and an optional external Image Signal Processor (ISP). The camera preferably has a high depth of field from any combination of decreased sensor size, decreased aperture size, and/or an Extended Depth of Field technology within the sensor and image processing system. The image processing may be handled internally on a System-On-Chip (SOC) or on an external ISP.

Figure 6B:
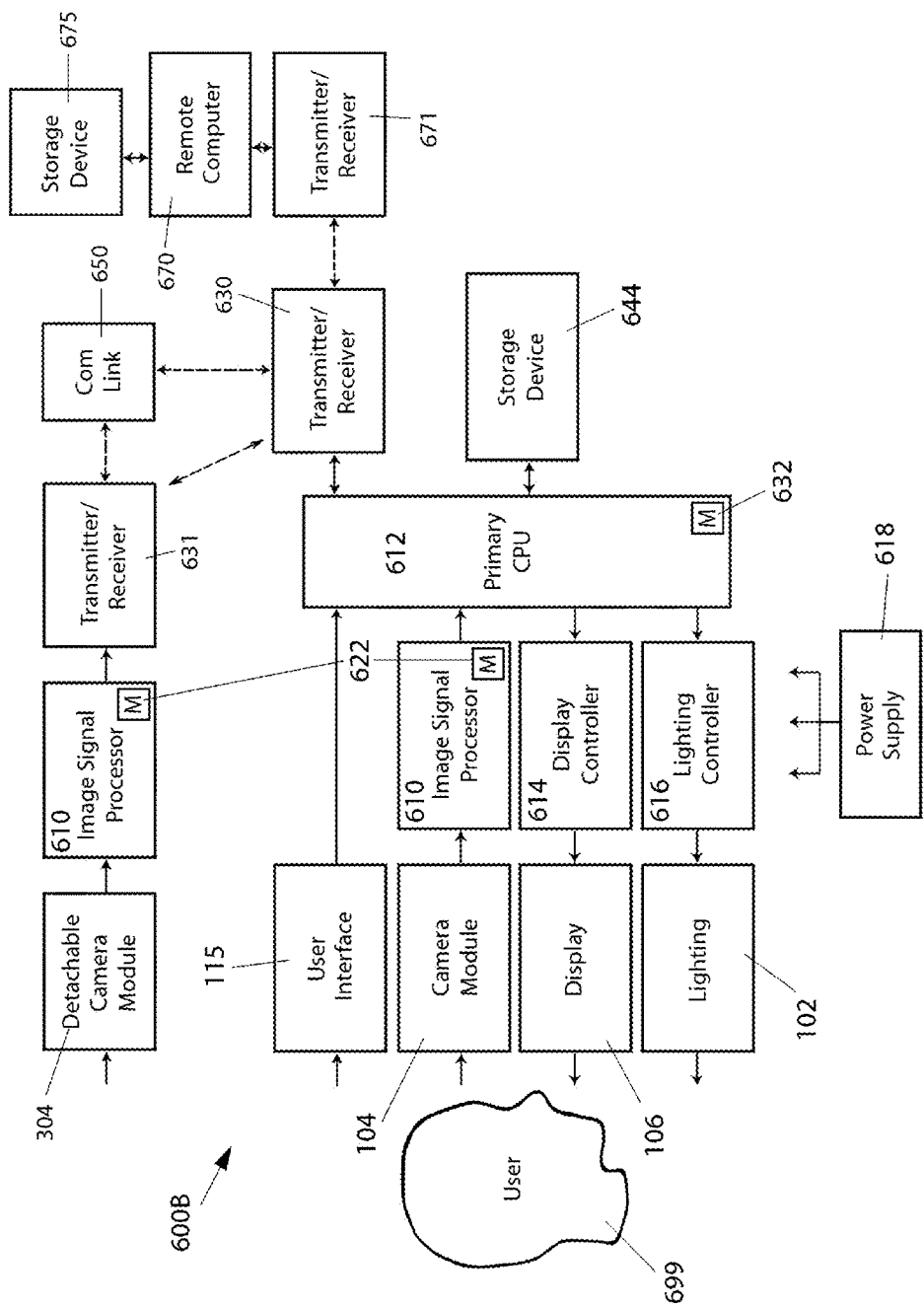
FIG. 6B illustrates an exemplary functional block diagram of electronic circuit modules provided in an image processing and control system provided in a second digital mirror system that has a detachable camera.

Referring now to FIG. 6B, a second block diagram of an image processing and control system 600B for digital mirrors is shown. The image processing and control system 600B is similar to the image processing and control system 600A illustrated in FIG. 6A but includes a communication link 650 (e.g., wireless router) for a digital mirror base unit to communicate with a detachable camera 304 and/or a remote computer system 670. The description of the common numbered blocks that were described previously are incorporated here by reference.

The primary CPU 612 can store data in the storage device 644. The storage device 644 may be removable or fixed within a digital mirror base. In either case the storage device may be one or more different types of storage mediums including a semiconductor type of storage medium (e.g., flash memory, a solid-state storage device.) to name one. If removeable, the storage device 644 may be a Secure Data (SD) card, a Compact Flash (CF) card, or a flash USB memory stick.

Alternatively, the primary CPU 612 may connect to a remote computer system 670 to store data at its location. In one embodiment, a digital mirror base may communication wirelessly with the remote computer system or the detachable camera through a transmitter/receiver 630. The remoter computer system 670 includes a transmitter/receiver module 671 to communicate with the digital mirror base or other mobile devices.

The remote computer system 670 includes one or more storage devices 675 to provide a significantly larger data capacity to store data. The primary CPU 612 may send data to the remote computer system for storage in its storage devices 675 over a wireless communication link established by the pairs of transmitter/receivers 630,671. The remote computer system 670 may send/receive instructions and or data from the primary CPU 612 to facilitate the data transfer. Alternatively, the primary CPU 612 may send data to the remote computer system 670 by a wire cable, such as a Universal Serial Bus (USB) cable coupled between USB transmitter/receivers using a USB communication protocol.

The image processing and control system 600B illustrates the detachable camera module 304. The detachable camera module 304 may send data and receive control signals over a communication link established by the pairs of transmitter/receivers 630,631. The detachable camera module 304 captures pixel data and may then process the pixel data or simply send it to the digital mirror base for storage or for display. The detachable camera module 304 may include its own light source 102 that is controlled by the primary CPU 612 to capture the pixel data. The detachable camera module 304 may include its own image signal processor and frame buffer memory. Otherwise, the pixel data may be sent over the communication link and through the primary CPU to the image signal processor 610 of the digital mirror base.

Figure 7:
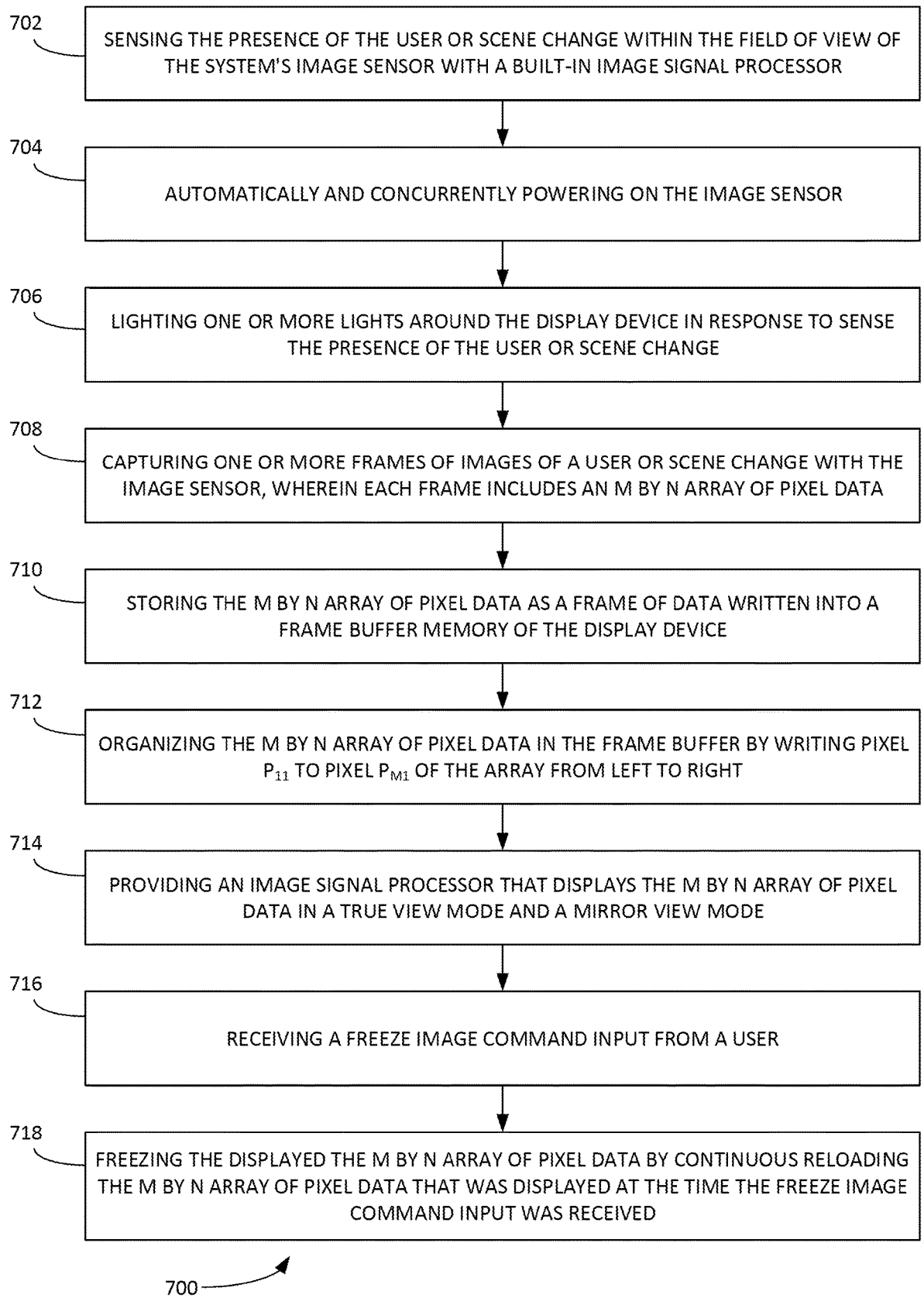
FIG. 7 illustrates an example process provided herein, according to some embodiments.

FIG. 7 illustrates an example process 700 provided herein, according to some embodiments. Process 700 can display pixel data without capturing or storing the image for video data as would with a mobile phone or digital tablet. Process 700 can continue to redisplay the temporary image data on the screen so that subject appear frozen at time indicated (e.g. a screen touch or mouse click). Process 700 does not use system memory to freeze the digital image. It instead is stored in volatile memory. However, the user can then choose to store data in nonvolatile memory for archiving. A user can selectively freeze an image or replay a stored image to see themselves as they were in a past moment using volatile memory or nonvolatile memory. The user no longer needs to hold a position or expression, or perform a motion over and over, or hold their eyes open to see themselves as the digital mirror can capture images for later display when a user's eyes are closed, all of which can be done using volatile memory or nonvolatile memory.

Process 700 provides a display device. Process 700 senses the presence of the user or scene change within the field of view of the system's image sensor with a built-in image signal processor. Process 700 automatically and concurrently powers on the image sensor. Process 700 lights one or more lights around the display device in response to sense the presence of the user or scene change.

Process 700 captures one or more frames of images of a user or scene change with the image sensor. Each frame includes an M by N array of pixel data. The M by N array of pixel data comprises a data structure consisting of a collection of pixel elements enumerated as pixel $P_{11}$ to pixel $P_{m1}$. Process 700 stores the M by N array of pixel data as a frame of data written into a frame buffer memory of the display device.

Process 700 organizes the M by N array of pixel data in the frame buffer by writing pixel $P_{11}$ to pixel $P_{m1}$ from left to right. Process 700 provides an image signal processor that displays the M by N array of pixel data in a true view mode and a mirror view mode.

Process 700 receives a freeze image command input from a user. Process 700 freezes the displayed the M by N array of pixel data by continuous reloading the M by N array of pixel data that was displayed at the time the freeze image command input was received.

In the true view mode, the image processor reads out the frame of data from left to right, from a pixel $P_{11}$ to a pixel $P_{m1}$ and instructs the frame of data to be displayed on the display device with pixel $P_{11}$ displayed in the upper left corner, with pixel $P_{m1}$ displayed in the upper right corner, with pixel $P_{1n}$ displayed in the lower left corner, and pixel $P_{mn}$ displayed in the lower right corner.

In the mirror view mode, the image processor reads out the frame of data by reversing an addressing of memory locations into the frame buffer memory such that the arrangement of the pixel data in the rows and columns is read out of the memory locations in a reverse order of the true view mode. Process 700 displays one or more captured frames of images in a true view mode or a mirror view mode on the display device.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method comprising:
    for a digital mirror:
        providing a display device;
        sensing the presence of the user or scene change within the field of view of the system's image sensor with a built-in image signal processor;
        automatically and concurrently powering on the image sensor;
        lighting one or more lights around the display device in response to sense the presence of the user or scene change;
        capturing one or more frames of images of a user or scene change with the image sensor, wherein each frame includes an M by N array of pixel data, wherein the M by N array of pixel data comprises a data structure consisting of a collection of pixel elements enumerated as pixel $P_{11}$ to pixel $P_{m1}$;
        storing the M by N array of pixel data as a frame of data written into a frame buffer in a volatile memory of the display device;
        organizing the M by N array of pixel data in the frame buffer by writing pixel $P_{11}$ to pixel $P_{m1}$ from left to right;
        providing an image signal processor that displays the M by N array of pixel data in a true view mode and a mirror view mode;
        receiving a freeze image command input from a user; and
        freezing the displayed the M by N array of pixel data by continuous reloading the M by N array of pixel data into the volatile memory that was displayed at the time the freeze image command input was received;
        wherein in the true view mode, the image processor reads out the frame of data from left to right, from a pixel $P_{11}$ to a pixel $P_{m1}$ and instructs the frame of data to be displayed on the display device with pixel $P_{11}$ displayed in the upper left corner, with pixel Pm1 displayed in the upper right corner, with pixel $P_{1n}$ displayed in the lower left corner, and pixel $P_{mn}$ displayed in the lower right corner, and
        wherein in the mirror view mode, the image processor reads out the frame of data by reversing an addressing of memory locations into the frame buffer memory such that the arrangement of the pixel data in the rows and columns is read out of the memory locations in a reverse order of the true view mode; and
        displaying one or more captured frames of images in a true view mode or a mirror view mode on the display device.

2. The computerized method of claim 1 further comprising:
    displaying one or more captured frames of images in a true view mode by displaying pixel $P_{11}$ is displayed in the upper left corner, displaying pixel $P_{m1}$ in the upper right corner, displaying pixel $P_{1n}$ is displayed in the lower left corner, and displaying pixel $P_{mn}$ in the lower right corner such that the pixel data is displayed on the display device of the digital mirror as it was captured by the image capture device.

3. The computerized method of claim 1 further comprising:
displaying one or more captured frames of images in a true view mode by displaying pixel $P_{m1}$ in the upper left corner of the display device, displaying pixel $P_{11}$ in the upper right corner of the display device, displaying pixel $P_{mn}$ in the lower left corner, and displaying pixel $P_{1n}$ in the lower right corner.

4. The computerized method of claim 1 further comprising:
selecting to display true view images or mirrored view images of the frames of images on the display device; and
in response to the selection of true view images, displaying true view images of the frames of images with the display device.

5. The computerized method of claim 1, wherein the selectively powering on includes:
sensing the presence of a user within the field of view of the display device; and
automatically powering on the image sensor and the display device in response to sensing the presence of the user.

6. The computerized method of claim 1, further comprising:
selectively magnifying a portion of the one or more frames of images of the user for display as the mirrored images or true view images with the display device.

7. The computerized method of claim 6, wherein the selectively magnifying is selected by pressing a button of a user interface.

8. The computerized method of claim 7, wherein the display device includes a touch screen; and the selectively magnifying includes touching a finger on the touch screen on the portion of the image to magnify.

9. The computerized method of claim 8 further comprising:
extending the image sensor away from the display device to capture one or more left side images, right side images, or back side images of the user.

10. The computerized method of claim 9 further comprising:
diffusing the light generated by the one or more lights to produce a softer light for the object or user in the target viewing area.

11. The computerized method of claim 10 further comprising:
optically zooming in and out on the user to select a view for the capture of images for display on the display device.

12. The computerized method of claim 11 further comprising:
sensing initial ambient lighting; and
selecting a light intensity for light generated by the one or more lights in response to the initial ambient lighting.

13. The computerized method of claim 12, wherein the digital mirror comprises a plurality of camera an extendible left camera, a center camera, and an extendible right camera.

14. The computerized method of claim 13, wherein the digital mirror simultaneously displays an extendible left camera image, a center camera image, and an extendible right camera image.

15. The computerized method of claim 14, wherein the user is able to select, using the touch screen, the true view mode and the mirror view mode for the extendible left camera image, the center camera image, and the extendible right camera image.

16. The computerized method of claim 1, wherein the freeze image command input comprises a user touch sensed by a touch screen of the digital mirror.

17. The computerized method of claim 16, wherein the pixel data is displayed without storing the pixel data in a non-buffer non-volatile memory.

18. A method for a digital mirror comprising:
automatically and concurrently powering an image sensor, a display device, and one or more lights around the display device; freezing a live camera image stream;
by repeatedly displaying a same data or image frame selected by a user from a system's volatile memory, without capturing or storing or archiving the image frame; and
redisplaying the image frame repeatedly with an ability to manipulate the paused or frozen frames' attributes.

19. A method for a digital mirror comprising:
freezing, once selected by a user, one or more frames without capturing or storing the frames, either at a time lapse interval set by the user or without the time lapse;
displaying of multiple views or perspectives of a plurality of cameras' field of view of a scene or the user in the scene with multiple cameras connected to the system's bezel enclosure or remote cameras from multiple views comprising a telescoping camera back or a side or a top or a bottom view and a front facing camera True/Mirrored view.

* * * * *